(12) United States Patent
Anegawa et al.

(10) Patent No.: US 11,833,717 B2
(45) Date of Patent: *Dec. 5, 2023

(54) THREE-DIMENSIONAL SHAPING DEVICE

(71) Applicant: Seiko Epson Corporation, Tokyo (JP)

(72) Inventors: Kenta Anegawa, Matsumoto (JP); Yasuto Kanai, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 17/358,106

(22) Filed: Jun. 25, 2021

(65) Prior Publication Data

US 2021/0402687 A1    Dec. 30, 2021

(30) Foreign Application Priority Data

Jun. 26, 2020  (JP) ................................ 2020-110149

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/218* (2017.08); *B29C 64/241* (2017.08);
(Continued)

(58) Field of Classification Search
CPC ... B29C 64/209; B29C 64/218; B29C 64/241; B29C 64/393; B33Y 30/00; B33Y 50/02
See application file for complete search history.

(56) References Cited

U.S. PATENT DOCUMENTS 2,871,516 A   2/1959  Sherman et al.
4,107,246 A   8/1978  LaSpisa
(Continued)

FOREIGN PATENT DOCUMENTS

CN   103878979 A   6/2014
CN   104290325 A   1/2015
(Continued)

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

A three-dimensional shaping device includes: a plasticizing unit configured to plasticize a material to generate a plasticized material; a stage having a deposition surface on which the plasticized material is deposited; an ejection unit that has a plurality of nozzles arranged side by side along a first axis parallel to the deposition surface of the stage, and that is configured to eject the plasticized material in a continuous linear form from the plurality of nozzles toward the deposition surface; an ejection switching unit configured to individually switch between stopping and resuming ejection of the plasticized material from the plurality of nozzles; a moving unit configured to move the ejection unit with respect to the stage along a second axis that is parallel to the deposition surface of the stage and that intersects the first axis; and a control unit configured to laminate a shaping layer formed of the plasticized material on the deposited surface of the stage by controlling the plasticizing unit, the ejection switching unit, and the moving unit.

10 Claims, 16 Drawing Sheets

(51) Int. Cl.
  *B29C 64/393* (2017.01)
  *B29C 64/241* (2017.01)
  *B29C 64/218* (2017.01)
  *B33Y 50/02* (2015.01)

(52) U.S. Cl.
  CPC ............ *B29C 64/393* (2017.08); *B33Y 30/00* (2014.12); *B33Y 50/02* (2014.12)

(56) References Cited

U.S. PATENT DOCUMENTS

| | | |
|---|---|---|
| 4,721,589 A | 1/1988 | Harris |
| 5,121,329 A | 6/1992 | Crump |
| 5,260,009 A | 11/1993 | Penn |
| 5,303,141 A | 4/1994 | Batchelder et al. |
| 5,340,433 A | 8/1994 | Crump |
| 5,402,351 A | 3/1995 | Batchelder et al. |
| 5,633,021 A | 5/1997 | Brown et al. |
| 5,747,077 A | 5/1998 | Yoshida et al. |
| 6,019,916 A | 2/2000 | Mizuguchi et al. |
| 6,401,001 B1 | 6/2002 | Jang et al. |
| 6,578,596 B1 | 6/2003 | Batchelder et al. |
| 7,874,825 B2 | 1/2011 | Khoshnevis |
| 10,254,499 B1 | 4/2019 | Cohen et al. |
| 10,981,332 B2 | 4/2021 | Chanclon et al. |
| 11,034,087 B2 | 6/2021 | Saito et al. |
| 11,077,619 B2 | 8/2021 | Yuwaki et al. |
| 11,161,297 B2 | 11/2021 | Tyler et al. |
| 11,413,809 B2 | 8/2022 | Hashimoto et al. |
| 11,446,865 B2 | 9/2022 | Streicher et al. |
| 2005/0015171 A1 | 1/2005 | Cruz-Uribe et al. |
| 2005/0015175 A1 | 1/2005 | Huang |
| 2007/0138678 A1 | 6/2007 | Khoshnevis |
| 2013/0141491 A1 | 6/2013 | Krichtman et al. |
| 2014/0252668 A1 | 9/2014 | Austin et al. |
| 2016/0046073 A1 | 2/2016 | Hadas |
| 2016/0082653 A1 | 3/2016 | Ohnishi |
| 2017/0008230 A1 | 1/2017 | Yuyama |
| 2017/0157820 A1 | 6/2017 | Ward et al. |
| 2017/0157831 A1 | 6/2017 | Mandel et al. |
| 2017/0157844 A1 | 6/2017 | Mandel et al. |
| 2017/0203506 A1 | 7/2017 | Hjelsand et al. |
| 2017/0203507 A1 | 7/2017 | Leavitt et al. |
| 2017/0210069 A1 | 7/2017 | Stubenruss |
| 2017/0210074 A1 | 7/2017 | Ueda et al. |
| 2017/0232681 A1 | 8/2017 | Xu et al. |
| 2017/0291364 A1 | 10/2017 | Womer |
| 2017/0297107 A1 | 10/2017 | Oka et al. |
| 2018/0169941 A1 | 6/2018 | Taniguchi et al. |
| 2018/0200955 A1 | 7/2018 | Hoelldorfer et al. |
| 2018/0311894 A1 | 11/2018 | Saito et al. |
| 2018/0326657 A1 | 11/2018 | Iwase |
| 2018/0348247 A1 | 12/2018 | Ando |
| 2019/0022934 A1 | 1/2019 | Kobe et al. |
| 2019/0022940 A1 | 1/2019 | Hofmann et al. |
| 2019/0030811 A1 | 1/2019 | Gasso et al. |
| 2019/0030820 A1* | 1/2019 | Saito .................... B29C 64/393 |
| 2019/0061243 A1 | 2/2019 | Saito et al. |
| 2019/0076924 A1 | 3/2019 | Jepeal et al. |
| 2019/0168446 A1 | 6/2019 | Leibig et al. |
| 2019/0217546 A1 | 7/2019 | Bosveld et al. |
| 2019/0315114 A1 | 10/2019 | Hjelsand et al. |
| 2019/0375003 A1 | 12/2019 | Mark |
| 2020/0016833 A1 | 1/2020 | Yuwaki et al. |
| 2020/0016834 A1 | 1/2020 | Yuwaki et al. |
| 2020/0094479 A1 | 3/2020 | Yamasaki et al. |
| 2020/0094480 A1 | 3/2020 | Yamasaki |
| 2020/0164575 A1 | 5/2020 | Yuwaki et al. |
| 2020/0198240 A1 | 6/2020 | Hashimoto et al. |
| 2020/0207017 A1 | 7/2020 | Yuwaki et al. |
| 2020/0230942 A1 | 7/2020 | Gasso et al. |
| 2020/0269515 A1 | 8/2020 | Takahashi |
| 2020/0406548 A1 | 12/2020 | Yuwaki et al. |
| 2021/0039306 A1 | 2/2021 | Busbee |
| 2021/0154910 A1 | 5/2021 | Cheng et al. |
| 2021/0162663 A1 | 6/2021 | Saito et al. |
| 2021/0206065 A1 | 7/2021 | Saito et al. |
| 2021/0387410 A1 | 12/2021 | Moore et al. |
| 2021/0402687 A1 | 12/2021 | Anegawa et al. |
| 2022/0032536 A1 | 2/2022 | Anegawa et al. |
| 2022/0118524 A1 | 4/2022 | Nakamura et al. |
| 2022/0134438 A1 | 5/2022 | Yamazaki |

FOREIGN PATENT DOCUMENTS

| | | |
|---|---|---|
| CN | 204622625 U | 9/2015 |
| CN | 105172143 A | 12/2015 |
| CN | 106573405 A | 4/2017 |
| CN | 106853683 A | 6/2017 |
| CN | 108790155 A | 11/2018 |
| CN | 109421269 A | 3/2019 |
| EP | 3437837 A1 | 2/2019 |
| JP | H03-158228 A | 7/1991 |
| JP | H05-345359 A | 12/1993 |
| JP | H06-179243 A | 6/1994 |
| JP | H07-096534 A | 4/1995 |
| JP | H11-042712 A | 2/1999 |
| JP | 2000-246780 A | 9/2000 |
| JP | 2005-344765 A | 12/2005 |
| JP | 2006-192710 A | 7/2006 |
| JP | 2010-241016 A | 10/2010 |
| JP | 2015-502870 A | 1/2015 |
| JP | 2015-148309 A | 8/2015 |
| JP | 2015-208879 A | 11/2015 |
| JP | 2016-064539 A | 4/2016 |
| JP | 2017-013351 A | 1/2017 |
| JP | 2017-035811 A | 2/2017 |
| JP | 2017-523934 A | 8/2017 |
| JP | 2017-528340 A | 9/2017 |
| JP | 2017-190505 A | 10/2017 |
| JP | 2018-012221 A | 1/2018 |
| JP | 2018-066056 A | 4/2018 |
| JP | 2018-187777 A | 11/2018 |
| JP | 2019-038157 A | 3/2019 |
| JP | 2019-064090 A | 4/2019 |
| JP | 2020-023189 A | 2/2020 |
| JP | 2020-524092 A | 8/2020 |
| WO | 2015/129733 A1 | 9/2015 |
| WO | 2015-135434 A1 | 9/2015 |
| WO | 2015-182675 A1 | 12/2015 |
| WO | 2016/020150 A1 | 2/2016 |
| WO | 2016-185626 A1 | 11/2016 |
| WO | 2017-008789 A1 | 1/2017 |
| WO | 2017-038984 A1 | 3/2017 |
| WO | 2018/038751 A1 | 3/2018 |
| WO | 2018/210183 A1 | 11/2018 |

* cited by examiner

THREE-DIMENSIONAL SHAPING DEVICE

The present application is based on, and claims priority from JP Application Serial Number 2020-110149, filed Jun. 26, 2020, the disclosure of which is hereby incorporated by reference herein in its entirety.

BACKGROUND

1. Technical Field

The present disclosure relates to a three-dimensional shaping device.

2. Related Art

JP-A-2006-192710 discloses a device that extrudes a thermoplastic material heated and melted by a preheater onto a base from an extrusion nozzle and laminates a molten material on the material cured on the base to produce a three-dimensional shaped object. The extrusion nozzle performs scanning according to preset shape data. WO 2016/185626 discloses a device that instantaneously heats, by applying a pulse voltage to a heating plate, the heating plate to melt a material in a flow path and cause thermal strain in a thin plate constituting a side wall of the flow path, and intermittently ejects the melted material from a plurality of ejection ports using the thermal strain of the thin plate.

As in JP-A-2006-192710, when a three-dimensional shaped object is shaped in a one-stroke manner using a device that ejects a material from one nozzle, a shaping time is long. Therefore, as in WO 2016/185626, the shaping time can be shortened using a device that ejects a material from a plurality of nozzles. However, in the device described in WO 2016/185626, since the material is intermittently ejected from each nozzle, voids may be unintentionally formed in a three-dimensional shaped object and intended strength may not be able to be secured.

SUMMARY

According to an aspect of the present disclosure, a three-dimensional shaping device is provided. The three-dimensional shaping device includes: a plasticizing unit configured to plasticize a material to generate a plasticized material; a stage having a deposition surface on which the plasticized material is deposited; an ejection unit that has a plurality of nozzles arranged side by side along a first axis parallel to the deposition surface of the stage, and that is configured to eject the plasticized material in a continuous linear form from the plurality of nozzles toward the deposition surface; an ejection switching unit configured to individually switch between stopping and resuming ejection of the plasticized material from the plurality of nozzles; a moving unit configured to move the ejection unit with respect to the stage along a second axis that is parallel to the deposition surface of the stage and that intersects the first axis; and a control unit configured to laminate a shaping layer formed of the plasticized material on the deposited surface of the stage by controlling the plasticizing unit, the ejection switching unit, and the moving unit.

DESCRIPTION OF EXEMPLARY EMBODIMENTS

A. First Embodiment

Figure 1:
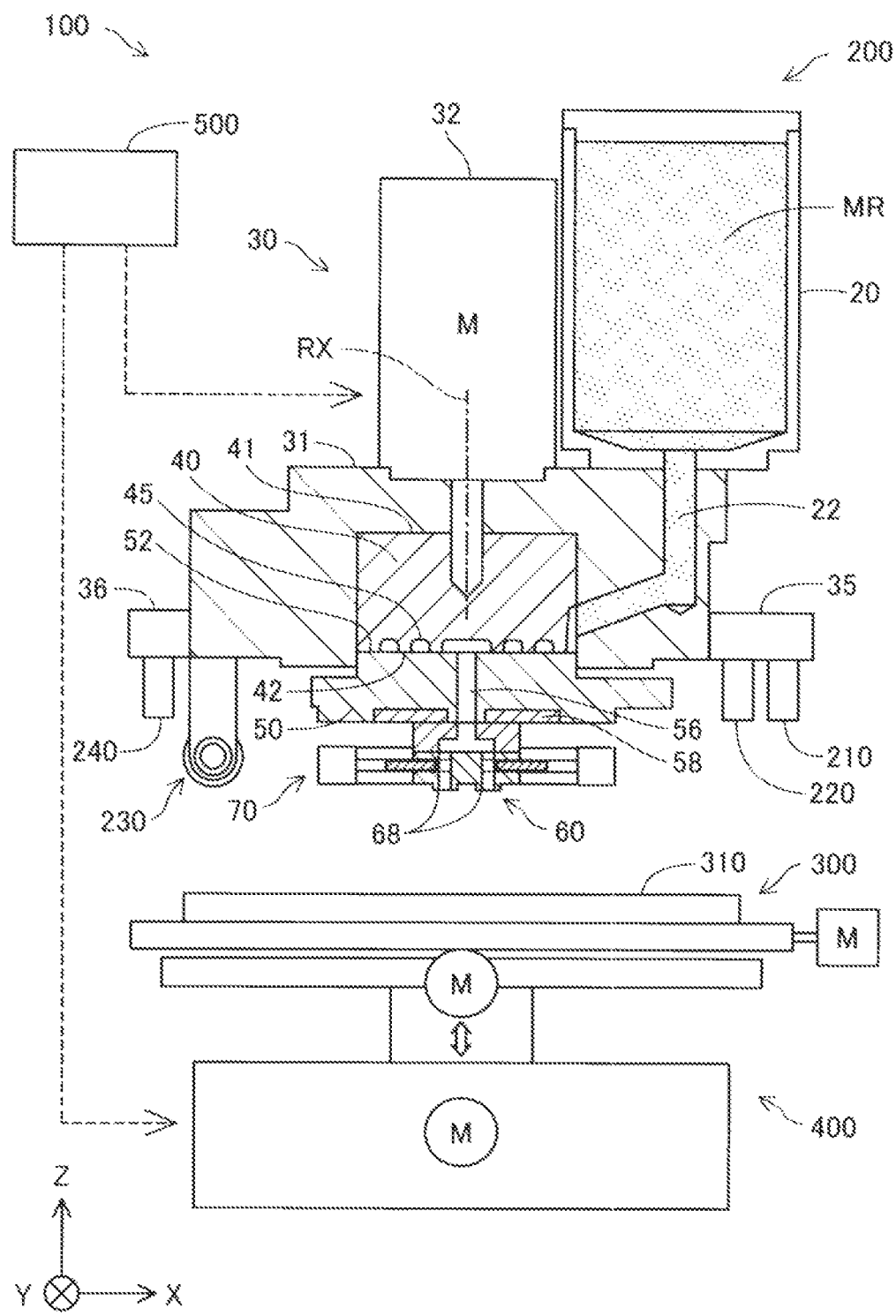
FIG. 1 is a cross-sectional view showing a schematic configuration of a three-dimensional shaping device according to a first embodiment.
Figure 2:
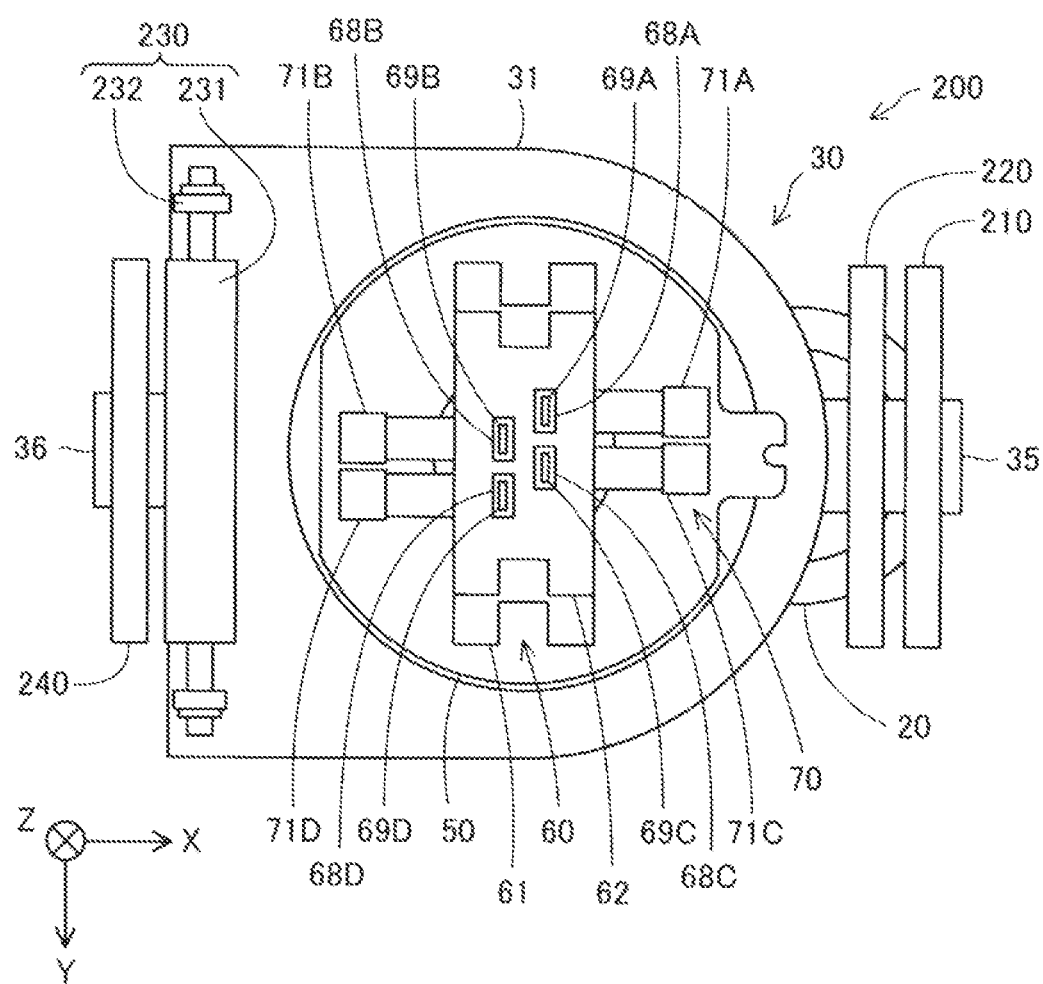
FIG. 2 is a bottom view showing a schematic configuration of a shaping unit according to the first embodiment.

FIG. 1 is a cross-sectional view showing a schematic configuration of a three-dimensional shaping device 100 according to a first embodiment. FIG. 2 is a bottom view showing a schematic configuration of a shaping unit 200 according to the present embodiment. In FIGS. 1 and 2, arrows representing X, Y, and Z axes, which are three coordinate axes orthogonal to one another, are shown. The X axis and the Y axis are coordinate axes parallel to a horizontal plane, and the Z axis is a coordinate axis perpendicular to the horizontal plane. The arrows representing the X, Y, and Z axes are also shown in other drawings as appropriate such that directions indicated by the arrows correspond to those in FIGS. 1 and 2. In the following description, a direction indicated by an arrow indicating the X axis is referred to as a +X direction, a direction indicated by an arrow indicating the Y axis is referred to as a +Y direction, and a direction indicated by an arrow indicating the Z axis is referred to as a +Z direction. A direction opposite to the +X direction is referred to as a −X direction, a direction opposite to the +Y direction is referred to as a −Y direction, and a direction opposite to the +Z direction is referred to as a −Z direction. The +X direction and the −X direction are simply referred to as an X direction when the +X direction and the −X direction are described without being particularly distinguished from each other, the +Y direction and the −Y direction are simply referred to as a Y direction when the +Y direction and the −Y direction are described without being particularly distinguished from each other, and the +Z direction and the −Z direction are simply referred to as a Z direction when the +Z direction and the −Z direction are described without being particularly distinguished from each other. The Y axis may be referred to as a first axis, the X axis may be referred to as a second axis, and the Z axis may be referred to as a third axis.

As shown in FIG. 1, the three-dimensional shaping device 100 includes the shaping unit 200, a stage 300, a moving unit 400, and a control unit 500. The shaping unit 200 includes an ejection unit 60 that ejects a plasticized material. The stage 300 has a deposition surface 310 on which the plasticized material ejected from the ejection unit 60 is deposited. The three-dimensional shaping device 100 ejects the plasticized material from the ejection unit 60 toward the deposition surface 310 of the stage 300 while relatively moving the ejection unit 60 and the stage 300 using the moving unit 400, thereby laminating a shaping layer formed of the plasticized material on the deposition surface 310 and shaping a three-dimensional shaped object which is a laminated body of the shaping layer.

In the present embodiment, the shaping unit 200 includes a material supply unit 20, a plasticizing unit 30, an ejection unit 60, an ejection switching unit 70, a surface activation unit 210, a reheating unit 220, a flattening unit 230, and a cooling unit 240.

The material supply unit 20 supplies a material MR to the plasticizing unit 30. In the present embodiment, an ABS resin formed in a pellet shape is used as the material MR. The material supply unit 20 includes a hopper that stores the material MR. A supply path 22 that couples the material supply unit 20 and the plasticizing unit 30 is provided below the material supply unit 20. The material MR stored in the material supply unit 20 is supplied to the plasticizing unit 30 via the supply path 22.

The plasticizing unit 30 plasticizes the material MR supplied from the material supply unit 20 to generate a plasticized material, and supplies the plasticized material to the ejection unit 60. The term "plasticize" means that heat is applied to a material having thermoplasticity to melt the material. The term "melt" means not only that a material having thermoplasticity is heated to a temperature equal to or higher than a melting point to become a liquid, but also that a material having thermoplasticity is heated to a temperature equal to or higher than a glass transition point to be softened, thereby exhibiting fluidity.

The plasticizing unit 30 includes a screw case 31, a drive motor 32, a flat screw 40, a barrel 50, and a heater 58. The screw case 31 is a housing that stores the flat screw 40. The barrel 50 is fixed to a lower end portion of the screw case 31. The flat screw 40 is stored in a space surrounded by the screw case 31 and the barrel 50.

The flat screw 40 has a substantially cylindrical shape in which a height in a direction along a central axis RX of the flat screw 40 is smaller than a diameter. The flat screw 40 is provided in the screw case 31 such that the central axis RX is parallel to the Z direction. An upper surface 41 side of the flat screw 40 is coupled to the drive motor 32 driven under control of the control unit 500, and the flat screw 40 is rotated around the central axis RX in the screw case 31 by a torque generated by the drive motor 32. The flat screw 40 has a groove forming surface 42, in which groove portions 45 are formed, at an opposite side of the flat screw 40 from the upper surface 41. The barrel 50 has a screw facing surface 52 facing the groove forming surface 42 of the flat screw 40. A communication hole 56 communicating with the ejection unit 60 is formed at a center of the screw facing surface 52.

Figure 3:
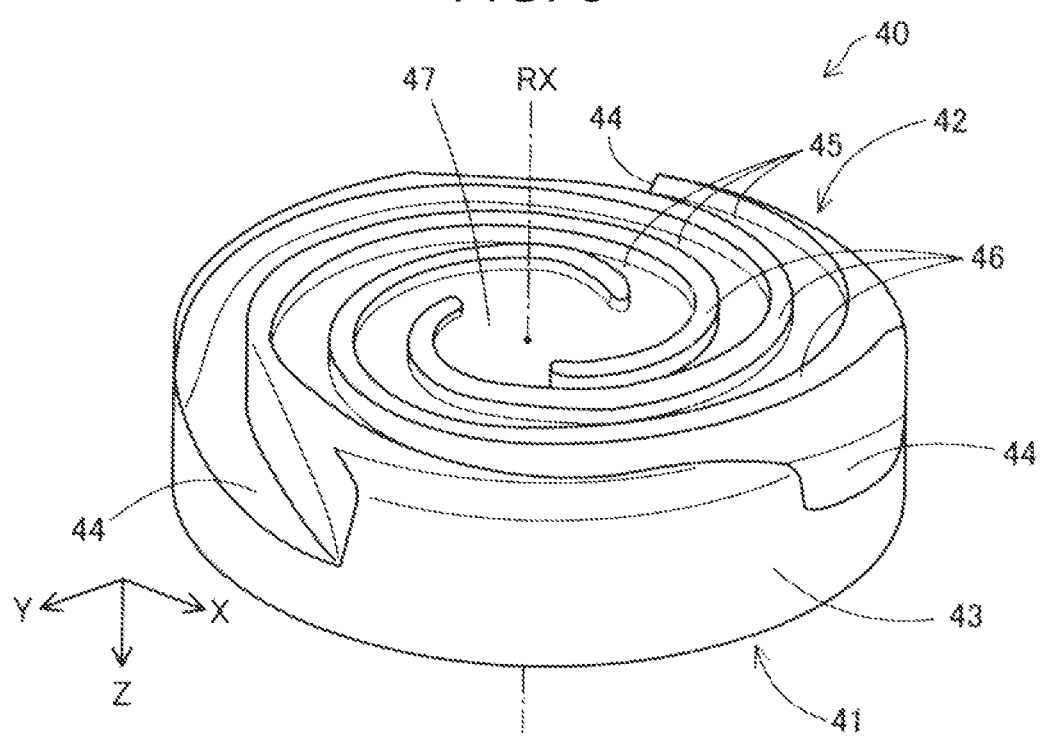
FIG. 3 is a perspective view showing a configuration of a flat screw.

FIG. 3 is a perspective view showing a configuration of the flat screw 40. In FIG. 3, the flat screw 40 is shown upside down from FIG. 1 so as to facilitate the understanding of the technique. In FIG. 3, a position of the center axis RX of the flat screw 40 is indicated by a one-dot chain line. A central portion 47 of the groove forming surface 42 of the flat screw 40 is formed as a recess to which one end of the groove portion 45 is coupled. The central portion 47 faces the communication hole 56 of the barrel 50 shown in FIG. 1. The central portion 47 intersects the central axis RX. In the present embodiment, the groove portion 45 extends in a spiral shape in a manner of drawing an arc from the central portion 47 toward an outer periphery of the flat screw 40. The groove portion 45 may be formed in an involute curve shape or may extend in a spiral shape. The groove forming surface 42 is provided with ridge portions 46 that constitute side wall portions of the groove portions 45 and extend along each groove portion 45. The groove portions 45 are continuous to material introduction ports 44 formed in a side surface 43 of the flat screw 40. The material introduction port 44 is a portion that receives the material MR supplied via the supply path 22 of the material supply unit 20. The material MR introduced from the material introduction ports 44 into the groove portions 45 is conveyed through the groove portions 45 toward the central portion 47 by rotation of the flat screw 40.

FIG. 3 shows the flat screw 40 having three groove portions 45 and three ridge portions 46. The numbers of the groove portions 45 and the ridge portions 46 that are formed in the flat screw 40 are not limited to three. The flat screw 40 may be formed with only one groove portion 45, or may be formed with two or more groove portions 45. Any number of the ridge portions 46 may be formed in accordance with the number of the groove portions 45. FIG. 3 shows the flat screw 40 in which the material introduction ports are formed at three positions. The positions of the material introduction ports 44 formed in the flat screw 40 are not limited to three positions. In the flat screw 40, the material introduction port 44 may be formed at only one position, or may be formed at two or more positions.

Figure 4:
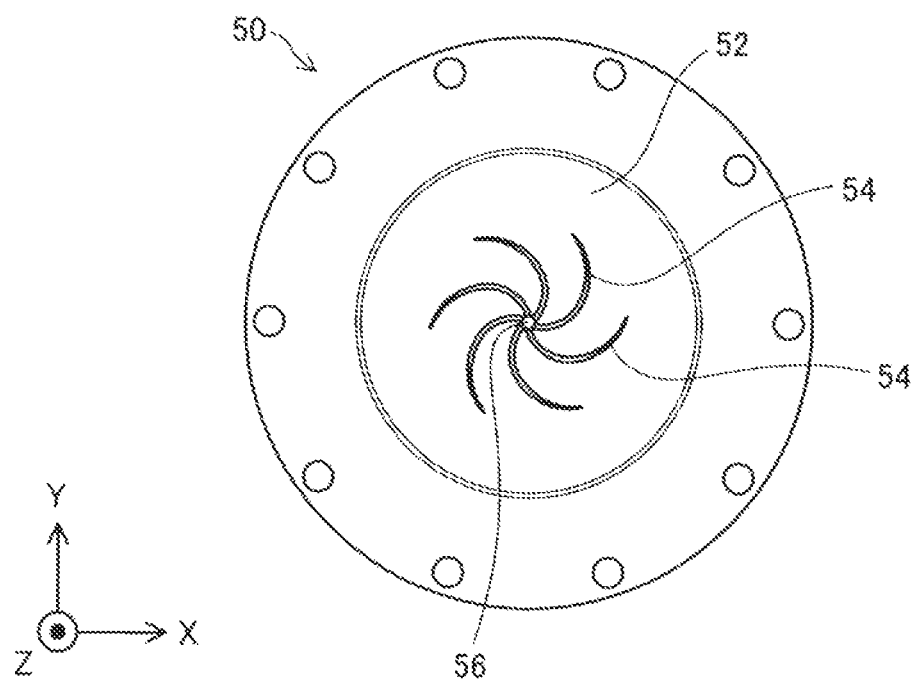
FIG. 4 is a top view showing a configuration of a barrel.

FIG. 4 is a top view showing a configuration of the barrel 50. As described above, the communication hole 56 communicating with the ejection unit 60 is formed at the center of the screw facing surface 52. The screw facing surface 52 is formed with a plurality of guide grooves 54 around the communication hole 56. Each of the guide grooves 54 has one end coupled to the communication hole 56, and extends spirally from the communication hole 56 toward an outer periphery of the screw facing surface 52 in a manner of drawing an arc. Each of the guide grooves 54 has a function of guiding a shaping material to the communication hole 56. The screw facing surface 52 may not be formed with the guide groove 54.

As shown in FIG. 1, the heater 58 that heats the material MR is fixed to a lower end portion of the barrel 50. In the present embodiment, the heater 58 has a ring-shaped outer shape and surrounds the communication hole 56. A temperature of the heater 58 is controlled by the control unit 500. The material MR conveyed into the groove portion 45 is plasticized by shearing caused by the rotation of the flat screw 40 and heat from the heater 58, and becomes a paste-shaped plasticized material. The plasticized material is supplied from the communication hole 56 to the ejection unit 60.

As shown in FIG. 2, in the present embodiment, the ejection unit 60 has four nozzles 68A to 68D. The ejection unit 60 includes a first flow path member 61 fixed to a lower end portion of the barrel 50 and a second flow path member 62 fixed to a lower end portion of the first flow path member 61. The nozzles 68A to 68D are arranged side by side along the Y direction at a lower end portion of the second flow path member 62. The ejection unit 60 ejects the plasticized material in a continuous linear form from each of the nozzles 68A to 68D toward the stage 300. In the following description, the nozzles 68A to 68D may be referred to as a first nozzle 68A, a second nozzle 68B, a third nozzle 68C, and a fourth nozzle 68D in order from a −Y direction side. Letters "A" to "D" attached to ends of the reference numerals of the nozzles 68A to 68D are letters attached to distinguish the nozzles 68A to 68D from one another. In the following description, when the nozzles 68A to 68D are described without being particularly distinguished from one another, the letters "A" to "D" are not added to the ends of the reference numerals. The number of nozzles 68 formed in the ejection unit 60 is not limited to four, and may be two, three, or five or more.

Ejection ports 69A to 69D that allow the plasticized material to be ejected are formed in tip portions of the nozzles 68A to 68D at a −Z direction side. In the present embodiment, an opening shape of each of the ejection ports 69A to 69D is a rectangle having a longitudinal direction along the Y direction. The ejection ports 69A to 69D have the same size. The opening shape of each of the ejection ports 69A to 69D is not limited to a rectangle, and may be, for example, a square, a polygon other than a quadrangle, or a circle. The opening shapes and sizes of the ejection ports 69A to 69D may be different from one another.

In the present embodiment, the nozzles 68A to 68D are arranged in the ejection unit 60 in a staggered manner when viewed in the +Z direction. More specifically, the ejection unit 60 includes a first nozzle row including the first nozzle 68A and the third nozzle 68C, and a second nozzle row including the second nozzle 68B and the fourth nozzle 68D. The first nozzle 68A and the third nozzle 68C that constitute the first nozzle row are arranged side by side on a straight line parallel to the Y direction. The second nozzle row is disposed on a −X direction side with respect to the first nozzle row at an interval from the first nozzle row in the X direction. The second nozzle 68B and the fourth nozzle 68D that constitute the second nozzle row are arranged side by side on a straight line parallel to the Y direction. Positions of the nozzles 68A and 68C constituting the first nozzle row in the Y direction are different from positions of the nozzles 68B and 68D constituting the second nozzle row in the Y direction. The second nozzle 68B is disposed between the first nozzle 68A and the third nozzle 68C in the Y direction, and the third nozzle 68C is disposed between the second nozzle 68B and the fourth nozzle 68D in the Y direction. The nozzles 68A to 68D may be arranged side by side on a straight line instead of being arranged in a staggered manner.

In the present embodiment, the first nozzle 68A and the second nozzle 68B are disposed such that a peripheral edge portion of the ejection port 69A of the first nozzle 68A on a +Y direction side and a peripheral edge portion of the ejection port 69B of the second nozzle 68B on a −Y direction side are at the same position in the Y direction. The second nozzle 68B and the third nozzle 68C are disposed such that a peripheral edge portion of the ejection port 69B of the second nozzle 68B on the +Y direction side and a peripheral edge portion of the ejection port 69C of the third nozzle 68C on the −Y direction side are at the same position in the Y direction. The third nozzle 68C and the fourth nozzle 68D are disposed such that a peripheral edge portion of the ejection port 69C of the third nozzle 68C on the +Y direction side and a peripheral edge portion of the ejection port 69D of the fourth nozzle 68D on the −Y direction side are at the same position in the Y direction. That is, in the present embodiment, when viewed in the +X direction or the −X direction, the nozzles 68A to 68D are disposed such that the ejection ports 69 of the adjacent nozzles 68 are in contact with each other.

Figure 5:
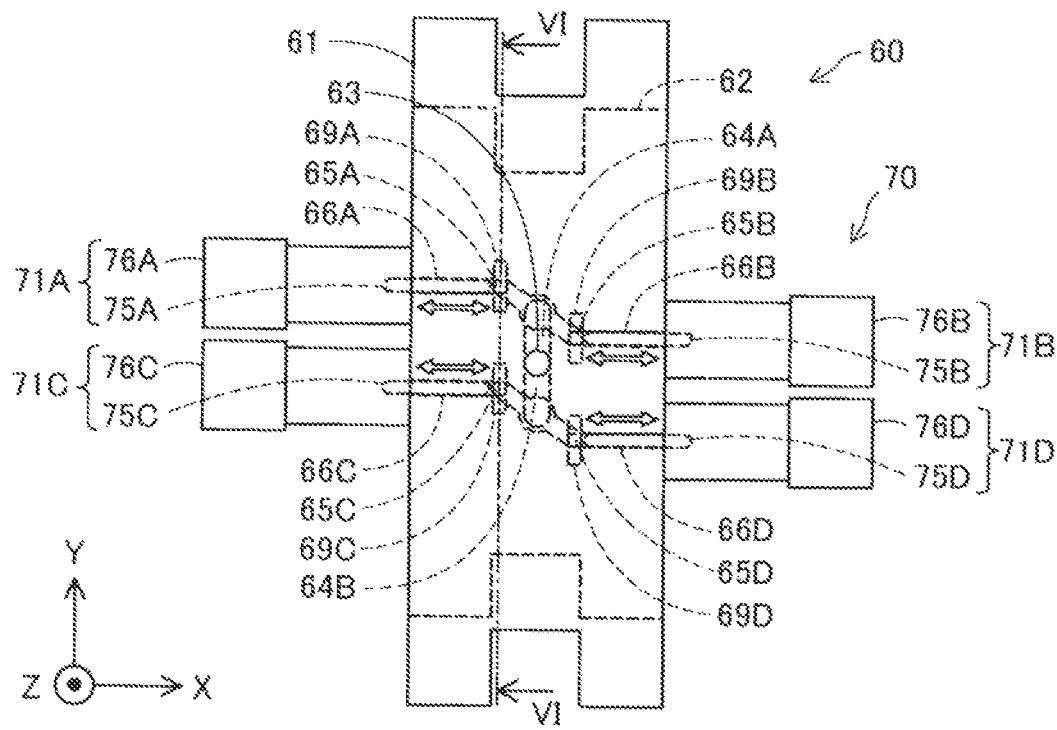
FIG. 5 is a top view showing a configuration of an ejection unit and an ejection switching unit.
Figure 6:
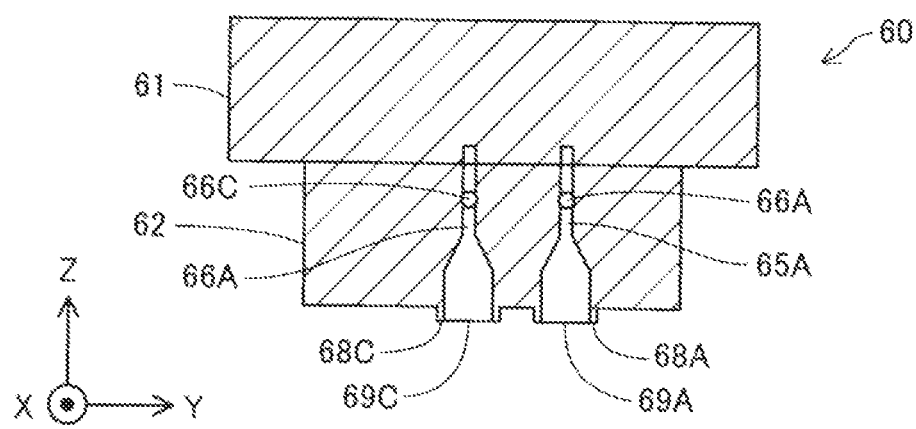
FIG. 6 is a cross-sectional view taken along a line VI-VI in FIG. 5.

FIG. 5 is a top view showing a configuration of the ejection unit 60 and the ejection switching unit 70. FIG. 6 is a cross-sectional view taken along a line VI-VI in FIG. 5. As shown in FIG. 5, the ejection unit 60 has one common flow path 63, two branch flow paths 64A and 64B, and four individual flow paths 65A to 65D. The individual flow paths 65A to 65D are formed for the nozzles 68A to 68D, respectively. An upstream end portion of the common flow path 63 communicates with the communication hole 56 of the barrel 50. A downstream end portion of the common flow path 63 communicates with the first branch flow path 64A and the second branch flow path 64B. A downstream end portion of the first branch flow path 64A communicates with the first individual flow path 65A and the third individual flow path 65C. A downstream end portion of the second branch flow path 64B communicates with the second individual flow path 65B and the fourth individual flow path 65D. As shown in FIG. 6, the first individual flow path 65A communicates with the ejection port 69A of the first nozzle 68A, and the second individual flow path 65B communicates with the ejection port 69B of the second nozzle 68B. The third individual flow path 65C communicates with the ejection port 69C of the third nozzle 68C, and the fourth individual flow path 65D communicates with the ejection port 69D of the fourth nozzle 68D.

The common flow path 63 has a through hole formed in the first flow path member 61 along the Z direction. Each of the branch flow paths 64A and 64B has a groove formed in the first flow path member 61 in a horizontal direction. Each of the individual flow paths 65A to 65D has a groove formed in the second flow path member 62 along the horizontal direction and a through hole formed in the second flow path member 62 along the Z direction. A length of the flow path from the downstream end portion of the common flow path 63 to the ejection port 69A of the first nozzle 68A, a length of the flow path from the downstream end portion of the common flow path 63 to the ejection port 69B of the second nozzle 68B, a length of the flow path from the downstream end portion of the common flow path 63 to the ejection port 69C of the third nozzle 68C, and a length of the flow path from the downstream end portion of the common flow path 63 to the ejection port 69D of the fourth nozzle 68D are the same. Therefore, a pressure loss when the plasticized material flows from the downstream end portion of the common flow path 63 to each of the ejection ports 69A to 69D can be equalized, and thus it is possible to prevent occurrence of variation in an amount of the plasticized material ejected from each of the ejection ports 69A to 69D.

As shown in FIG. 5, the ejection switching unit individually switches between stopping and restarting ejection of the plasticized material from each of the nozzles 68A to 68D. In the present embodiment, the ejection switching unit 70 includes valves 71A to 71D provided for the individual flow paths 65A to 65D, respectively. The valves 71A to 71D include valve portions 75A to 75D and valve drive units 76A to 76D, respectively.

In the present embodiment, each of the valve portions 75A to 75D has a columnar outer shape having a central axis along the X direction. The second flow path member 62 of the ejection unit 60 is provided with cylindrical cylinder portions 66A to 66D for the individual flow paths 65A to 65D, respectively. Each of the cylindrical cylinder portions 66A to 66D has a central axis along the X direction. The valve portions 75A to 75D are disposed in the cylinder portions 66A to 66D, respectively.

In the present embodiment, the valve drive units 76A to 76D are of a pneumatic type in which the valve portions 75A to 75D are driven using compressed air supplied from a compressor. Under control of the control unit 500, the valve drive units 76A to 76D translationally move the valve portions 75A to 75D along the X direction to individually open and close the individual flow paths 65A to 65D. For example, the valve drive unit 76A moves the valve portion 75A from a position shown in FIG. 5 toward the +X direction to close the first individual flow path 65A by the valve portion 75A, and returns the valve portion 75A to the position shown in FIG. 5 to open the first individual flow path 65A. By individually opening and closing the individual flow paths 65A to 65D, stopping and resuming the ejection of the plasticized material from the nozzles 68A to 68D are individually switched. The valve drive units 76A to 76D are not limited to being of the pneumatic type described above, and may be of a solenoid type in which the valve portions 75A to 75D are driven using an electromagnetic force generated by a solenoid, or may be of an electric type in which the valve units 75A to 75D are driven using a rotational force generated by a motor. The valves 71A to 71D may respectively and individually open and close the individual flow paths 65A to 65D by a rotational operation instead of a translational operation. In this case, each of the valves 71A to 71D may be, for example, a butterfly valve.

As shown in FIGS. 1 and 2, the surface activation unit 210 is disposed at a +X direction side with respect to each of the nozzles 68A to 68D and on a +Z direction side with respect to each of the nozzles 68A to 68D. The first support unit 35 is fixed to a side surface of the screw case 31 at the +X direction side, and the surface activation unit 210 is fixed to the first support unit 35. The surface activation unit 210 chemically activates a surface of a shaping layer formed at the stage 300. In the present embodiment, the surface activation unit 210 is an atmospheric pressure plasma device. The surface activation unit 210 chemically activates the surface of the shaping layer by irradiating the shaping layer formed at the stage 300 with atmospheric pressure plasma under the control of the control unit 500, and increases surface free energy of the shaping layer, in other words, wettability of the shaping layer. The surface activation unit 210 may chemically activate the surface of the shaping layer by irradiating the shaping layer with an ion beam or ultraviolet rays instead of irradiating the shaping layer with plasma.

The reheating unit 220 is disposed between each of the nozzles 68A to 68D and the surface activation unit 210 in the X direction and on the +Z direction side with respect to each of the nozzles 68A to 68D. The reheating unit 220 is fixed to the first support unit 35. The reheating unit 220 heats the shaping layer formed at the stage 300. In the present embodiment, the reheating unit 220 is a blower that sends out hot air whose temperature has been raised by a built-in heater. The hot air means a flow of air or inert gas at a temperature equal to or higher than the glass transition point of the material MR. The reheating unit 220 heats an upper surface of the shaping layer formed at the stage 300 to a temperature equal to or higher than the glass transition point by blowing hot air toward the shaping layer under the control of the control unit 500. The reheating unit 220 may be configured of, for example, a halogen lamp instead of a blower including a built-in heater. The reheating unit 220 may be disposed at the +X direction side with respect to the surface activation unit 210, instead of between each of the nozzles 68A to 68D and the surface activation unit 210 in the X direction.

The flattening unit 230 is disposed at the −X direction side with respect to each of the nozzles 68A to 68D and at the −Z direction side with respect to each of the nozzles 68A to 68D. The flattening unit 230 is fixed to a lower end portion of the screw case 31. The flattening unit 230 flattens the shaping layer formed at the stage 300. In the present embodiment, the flattening unit 230 includes a roller 231 and a roller support unit 232 that supports the roller 231. The roller 231 is disposed such that a rotation axis thereof is parallel to the Y direction. The flattening unit 230 uses the roller 231 to press and flatten the uncured shaping layer formed of the plasticized material ejected from each of the nozzles 68A to 68D. In the present embodiment, the roller support unit 232 has a function of raising and lowering the roller 231 under the control of the control unit 500, and can change a distance between the stage 300 and the roller 231 in the Z direction. By changing the distance between the stage 300 and the roller 231 in the Z direction, it is possible to adjust a pressing force when the shaping layer is pressed by the roller 231. The flattening unit 230 may include a squeegee instead of the roller 231 and flatten the shaping layer by the squeegee. The roller support unit 232 may be referred to as a position changing unit. The roller support unit 232 may not be configured to be able to change a position of the roller 231 in the Z direction.

The cooling unit 240 is disposed on the −X direction side with respect to the flattening unit 230 and on the +Z direction side with respect to each of the nozzles 68A to 68D. A second support unit 36 is fixed to a side surface of the screw case 31 on the −X direction side, and the cooling unit 240 is supported by the second support unit 36. The cooling unit 240 cools the shaping layer formed at the stage 300. In the present embodiment, the cooling unit 240 is a blower that sends out cold air. The cold air refers to a flow of air or inert gas at a temperature sufficiently lower than the glass transition point of the material MR. A temperature of the cold air is preferably equal to or lower than a room temperature of an installation place of the three-dimensional shaping device 100. Under the control of the control unit 500, the cooling unit 240 blows cold air toward the uncured shaping layer formed of the plasticized material ejected from each of the nozzles 68A to 68D, thereby cooling the shaping layer and promoting curing.

As shown in FIG. 1, the stage 300 is disposed in the −Z direction with respect to the ejection unit 60. As described above, the stage 300 has the deposition surface 310 that faces each of the nozzles 68A to 68D and on which the plasticized material ejected from each of the nozzles 68A to 68D is deposited. A three-dimensional shaped object is shaped on the deposition surface 310. In the present embodiment, the deposition surface 310 is provided parallel to the horizontal plane. The stage 300 is supported by the moving unit 400.

The moving unit 400 changes relative positions of the ejection unit 60 and the deposition surface 310. In the present embodiment, the moving unit 400 changes the relative positions of the ejection unit 60 and the deposition surface 310 by moving the stage 300. The moving unit 400 according to the present embodiment is a three-axis positioner that moves the stage 300 in three axial directions of the X, Y, and Z directions by power generated by three motors. Each motor is driven under the control of the control unit 500. The moving unit 400 may change the relative positions of the ejection unit 60 and the deposition surface 310 by moving the shaping unit 200 without moving the stage 300. The moving unit 400 may change the relative positions of the ejection unit 60 and the deposition surface 310 by moving both the shaping unit 200 and the stage 300. The moving unit 400 may not have a function of changing the relative positions of the ejection unit 60 and the deposition surface 310 in the Y direction.

The control unit 500 is a computer including one or a plurality of processors, a main storage device, and an input and output interface that inputs and outputs a signal to and from an outside. In the present embodiment, the control unit 500 exerts various functions by the processor executing a program and a command that are read into the main storage device. For example, the control unit 500 shapes a three-dimensional shaped object at the stage 300 by executing a shaping process to be described later. The control unit 500 may be a combination of a plurality of circuits instead of a computer.

Figure 7:
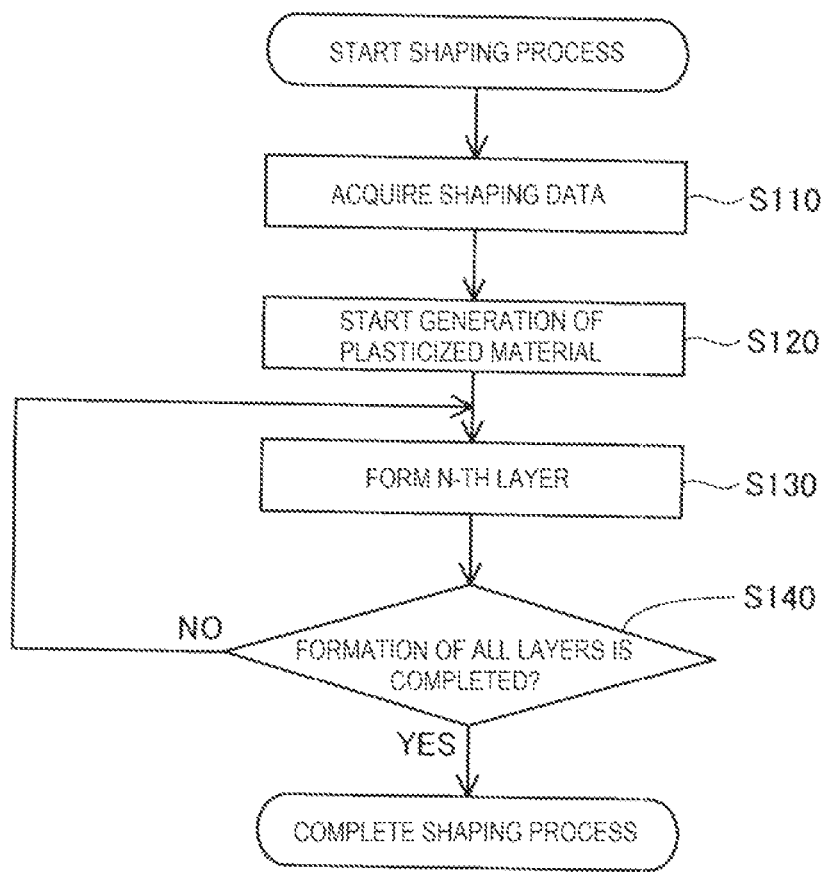
FIG. 7 is a flowchart showing content of a shaping process for shaping a three-dimensional shaped object.

FIG. 7 is a flowchart showing content of a shaping process for shaping a three-dimensional shaped object. The process is executed by the control unit 500 when a predetermined start operation is performed by a user on an operation panel provided in the three-dimensional shaping device 100 or a computer coupled to the three-dimensional shaping device 100.

First, in step S110, the control unit 500 acquires shaping data for shaping a three-dimensional shaped object. The shaping data is data representing information on a movement path of the ejection unit 60 with respect to the stage 300, an amount of the plasticized material ejected from each nozzle 68 of the ejection unit 60, and the like. The shaping data is created, for example, by causing slicer software installed in a computer coupled to the three-dimensional shaping device 100 to read shape data. The shape data is data representing a target shape of a three-dimensional shaped object created using three-dimensional CAD software, three-dimensional CG software, or the like. As the shape data, data in an STL format, an AMF format, or the like can be used. The slicer software divides the target shape of a three-dimensional shaped object into layers having a predetermined thickness, and creates the shaping data for each layer. The shaping data is represented by a G code, an M code, or the like. The control unit 500 acquires the shaping data from a computer coupled to the three-dimensional shaping device 100 or a recording medium such as a USB memory.

Next, in step S120, the control unit 500 controls the plasticizing unit 30 according to the shaping data to start generation of the plasticized material. The control unit 500 controls a rotation speed of the flat screw 40 and a temperature of the heater 58 provided in the barrel 50 to plasticize a material and generate a plasticized material. The plasticized material continues to be generated while the shaping process is performed.

In step S130, the control unit 500 forms a shaping layer. In the present embodiment, the control unit 500 controls, according to the shaping data, the plasticizing unit 30, the ejection switching unit 70, the moving unit 400, the surface activation unit 210, the reheating unit 220, the roller support unit 232 of the flattening unit 230, and the cooling unit 240 to form a shaping layer. Formation of a shaping layer will be described later. Thereafter, in step S140, the control unit 500 determines whether formation of all shaping layers is completed. The control unit 500 can determine that the formation of all shaping layers is completed using the shaping data. The control unit 500 repeats a process in step S130 and a process in step S140 until it is determined in step S140 that the formation of all shaping layers is completed. When it is determined in step S140 that the formation of all shaping layers is completed, the control unit 500 completes the process.

Figure 8:
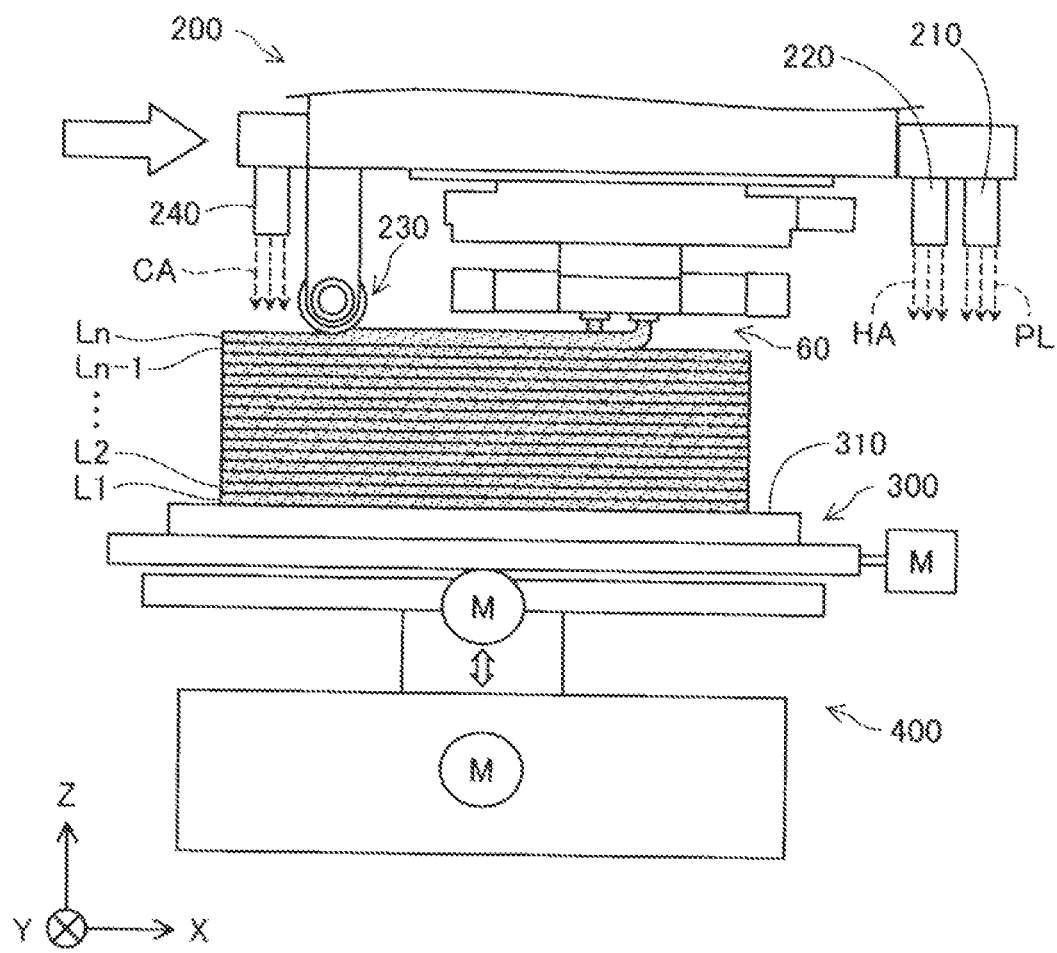
FIG. 8 is a side view schematically showing a state where a shaping layer according to the first embodiment is formed.
Figure 9:
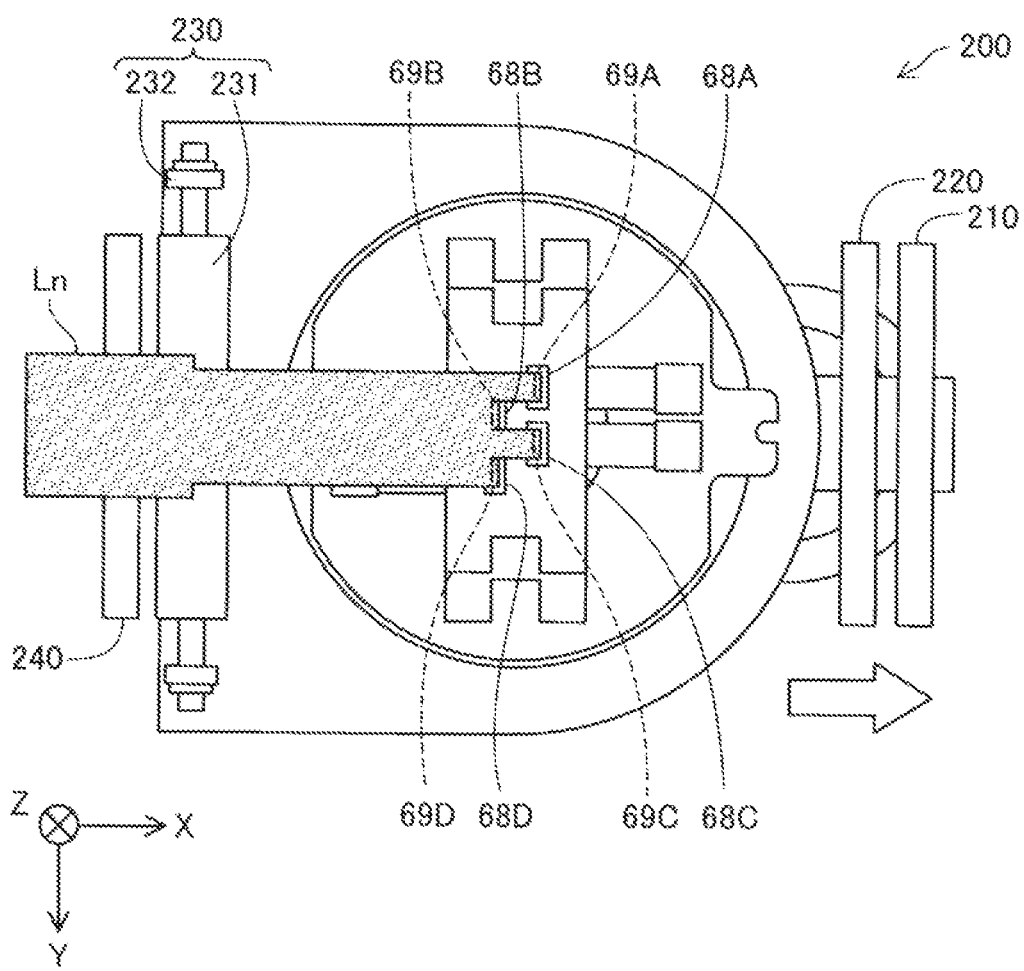
FIG. 9 is a bottom view schematically showing a state where the shaping layer according to the first embodiment is formed.

FIG. 8 is a side view schematically showing a state where a shaping layer is formed by the three-dimensional shaping device 100 according to the present embodiment. FIG. 9 is a bottom view schematically showing a state where a shaping layer is formed by the three-dimensional shaping device 100 according to the present embodiment. Before formation of a first layer $L_1$, which is the shaping layer to be formed first, is started, the shaping unit 200 is disposed at an initial position at the −X direction side with respect to the end portion of the stage 300 at the −X direction side. When the process in step S130 shown in FIG. 7 is started, as shown in FIG. 8, the control unit 500 controls the moving unit 400 to move the shaping unit 200 with respect to the stage 300 in the +X direction. The shaping unit 200 is moved with respect to the stage 300 in the +X direction, so that the surface activation unit 210, the reheating unit 220, the ejection unit 60, the flattening unit 230, and the cooling unit 240 which are provided in the shaping unit 200 pass over the stage 300 in this order. In the present embodiment, when the first layer $L_1$ is formed, the control unit 500 turns off irradiation with plasma PL from the surface activation unit 210 and sending of hot air HA from the reheating unit 220. The control unit 500 may form the first layer $L_1$ by turning on the irradiation with the plasma PL from the surface activation unit 210 and the sending of the hot air HA from the reheating unit 220.

When the ejection unit 60 passes over the stage 300, the plasticized material is ejected in a continuous linear form from each of the nozzles 68A to 68D of the ejection unit 60. At this time, the control unit 500 controls the ejection switching unit 70 to individually switch between stopping and resuming the ejection of the plasticized material from each of the nozzles 68A to 68D according to the target shape of the three-dimensional shaped object. The plasticized material ejected from each of the nozzles 68A to 68D is deposited on the stage 300 to form the first layer $L_1$.

The uncured first layer $L_1$ formed at the stage 300 is pressed and flattened by the roller 231 of the flattening unit 230. By pressing the first layer $L_1$ against the roller 231, adhesion between the first layer $L_1$ and the stage 300 is enhanced. Further, by flattening the first layer $L_1$, as shown in FIG. 8, a thickness of the first layer $L_1$ along the Z direction is decreased, and as shown in FIG. 9, a width of each portion of the first layer $L_1$ formed of the plasticized material ejected from each of the nozzles 68A to 68D along the Y direction is increased. Therefore, adhesion between the portions of the first layer $L_1$ formed of the plasticized material ejected from the nozzles 68 adjacent to each other in the Y direction is enhanced. For example, the adhesion between the portion of the first layer $L_1$ formed of the plasticized material ejected from the first nozzle 68A and the portion of the first layer $L_1$ formed of the plasticized material ejected from the second nozzle 68B is enhanced. When the first layer $L_1$ is formed, the control unit 500 may press, in a state where tip portions of the nozzles 68A to 68D and the stage 300 are brought close to each other, the first layer $L_1$ before being flattened by the flattening unit 230 with the tip portions of the nozzles 68A to 68D by moving the shaping unit 200 with respect to the stage 300 in the +X direction. In this case, since the adhesion between the first layer $L_1$ and the stage 300 is increased, it is possible to prevent the first layer $L_1$ from being peeled off from the stage 300 before being flattened by the first flattening unit 230.

The first layer $L_1$ flattened by the flattening unit 230 is cooled by cold air CA sent from the cooling unit 240 to promote curing. After cooling of the first layer $L_1$ is completed, the control unit 500 controls the moving unit 400 to move the shaping unit 200 with respect to the stage 300 in the +Z direction by the thickness of the first layer $L_1$. Further, the control unit 500 controls the moving unit 400 to move the shaping unit 200 with respect to the stage 300 in the −X direction and return the position of the shaping unit 200 with respect to the stage 300 in the X direction to the initial position.

When a n-th layer $L_n$, which is a n-th shaping layer to be formed and is an upper layer with respect to the first layer $L_1$, is formed with n as any natural number, the control unit 500 controls the moving unit 400 to move the shaping unit 200 with respect to the stage 300 in the +X direction. When the n-th layer $L_n$ is formed, the control unit 500 turns on the irradiation with the plasma PL from the surface activation unit 210, sending of the hot air HA from the reheating unit 220, and sending of the cold air CA from the cooling unit 240. The shaping unit 200 is moved with respect to the stage 300 in the +X direction, so that the surface activation unit 210, the reheating unit 220, the ejection unit 60, the flattening unit 230, and the cooling unit 240 which are provided in the shaping unit 200 pass over a (n−1)-th layer $L_{n-1}$, which is the shaping layer already formed, in this order.

An upper surface of the (n−1)-th layer $L_{n-1}$ is chemically activated by being irradiated with the plasma PL from the surface activation unit 210 passing over the (n−1)-th layer $L_{n-1}$. The hot air HA is blown from the reheating unit 220 passing over the (n−1)-th layer $L_{n-1}$, so that the upper surface of the (n−1)-th layer $L_{n-1}$ is heated to a temperature equal to or higher than the glass transition point. The plasticized material is ejected from each of the nozzles 68A to 68D of the ejection unit 60 passing over the (n−1)-th layer $L_{n-1}$, so that the n-th layer $L_n$ is formed at the (n−1)-th layer $L_{n-1}$. The n-th layer $L_n$ formed at the (n−1)-th layer $L_{n-1}$ is flattened by being pressed by the roller 231 of the flattening unit 230. By flattening the n-th layer $L_n$, adhesion between the n-th layer $L_n$ and the (n−1)-th layer $L_{n-1}$ is enhanced. The n-th layer $L_n$ flattened by the flattening unit 230 is cooled by the cold air CA sent from the cooling unit 240 to promote curing.

After cooling of the n-th layer $L_n$ is completed, the control unit 500 controls the moving unit 400 to move the shaping unit 200 with respect to the stage 300 in the +Z direction by a thickness of the n-th layer $L_n$. Further, the control unit 500 controls the moving unit 400 to move the shaping unit 200 with respect to the stage 300 in the −X direction and return the position of the shaping unit 200 with respect to the stage 300 in the X direction to the initial position. The control unit 500 repeats the process described above to laminate the shaping layer on the stage 300 and form a three-dimensional shaped object.

According to the three-dimensional shaping device 100 in the present embodiment described above, the shaping layer can be formed in a wide range at the stage 300 at one time using the four nozzles 68A to 68D, and thus the shaping time of the three-dimensional shaped object can be shortened. Further, since the plasticized material is ejected in a continuous linear form from each of the nozzles 68A to 68D, it is possible to prevent formation of a three-dimensional shaped object in which voids are unintentionally scattered along the +X direction. The +X direction is the moving direction of each of the nozzles 68A to 68D with respect to the stage 300 when the shaping layer is formed. Therefore, it is possible to shorten the shaping time of the three-dimensional shaped object while preventing a situation in which intended strength of the three-dimensional shaped object cannot be secured.

In the present embodiment, the ejection switching unit 70 can individually switch between stopping and resuming the ejection of the plasticized material from the nozzles 68A to 68D by the valves 71A to 71D provided in the individual flow paths 65A to 65D. Therefore, it is possible to individually switch between stopping and resuming the ejection of the plasticized material from each of the nozzles 68A to 68D with a simple configuration.

In the present embodiment, since the nozzles 68A to 68D are arranged in a staggered manner, it is possible to narrow an interval between the nozzles 68 adjacent to each other in the Y direction. In particular, in the present embodiment, the nozzles 68A to 68D are formed such that the ejection ports 69 of the adjacent nozzles 68 are in contact with each other when viewed along the X direction. Therefore, it is possible to prevent a formation of a void between portions of the n-th layer $L_n$ formed of the plasticized material ejected from the ejection ports 69 of the adjacent nozzles 68. Further, in the present embodiment, since the opening shape of each of the ejection ports 69A to 69D is rectangular, a transverse section of the plasticized material ejected from each of the ejection ports 69A to 69D is rectangular. Therefore, it is possible to effectively prevent the formation of a void between portions of the n-th layer $L_n$ formed of the plasticized material ejected from the ejection ports 69 of the adjacent nozzles 68.

In the present embodiment, since the surface activation unit 210 is provided in the shaping unit 200, the upper surface of the (n−1)-th layer $L_{n-1}$ can be chemically activated by the surface activation unit 210 prior to the ejection of the plasticized material from each of the nozzles 68A to 68D onto the (n−1)-th layer $L_{n-1}$. Therefore, a chemical bonding force between the (n−1)-th layer $L_{n-1}$ and the n-th layer $L_n$ can be increased.

In the present embodiment, since the reheating unit 220 is provided in the shaping unit 200, the upper surface of the (n−1)-th layer $L_{n-1}$ can be heated to a temperature equal to or higher than the glass transition point by the reheating unit 220 prior to the ejection of the plasticized material from each of the nozzles 68A to 68D onto the (n−1)-th layer $L_{n-1}$. Therefore, adhesion between the (n−1)-th layer $L_{n-1}$ and the n-th layer $L_n$ can be improved. In particular, in the present embodiment, since the adhesion between the (n−1)-th layer $L_{n-1}$ and the n-th layer $L_n$ can be enhanced without providing a chamber that covers the shaping unit 200 and the stage 300 and heating an inside of the chamber to a predetermined temperature, it is possible to reduce a size and power consumption of the three-dimensional shaping device 100.

In the present embodiment, since the flattening unit 230 is provided in the shaping unit 200, the uncured shaping layer formed of the plasticized material ejected from each of the nozzles 68A to 68D can be flattened by the flattening section 230. Since the width of each portion of the shaping layer formed of the plasticized material ejected from each of the nozzles 68A to 68D along the Y direction is increased by flattening the shaping layer, it is possible to improve the adhesion between the portions of the shaping layer formed of the plasticized material ejected from the nozzles 68 adjacent to each other in the Y direction. Further, by flattening the shaping layer, the adhesion between the first layer $L_1$ and the stage 300 and the adhesion between the (n−1)-th layer $L_{n-1}$ and the n-th layer $L_n$ can be improved.

In the present embodiment, since the cooling unit 240 is provided in the shaping unit 200, the uncured shaping layer formed of the plasticized material ejected from each of the nozzles 68A to 68D can be cooled by the cooling unit 240 to promote curing. Therefore, it is possible to reduce a waiting time until the (n−1)-th layer $L_{n-1}$ is cured during a period from the formation of the (n−1)-th layer $L_{n-1}$ to a start of the formation of the n-th layer $L_n$, and to shorten the shaping time of the three-dimensional shaped object.

B. Second Embodiment

Figure 10:
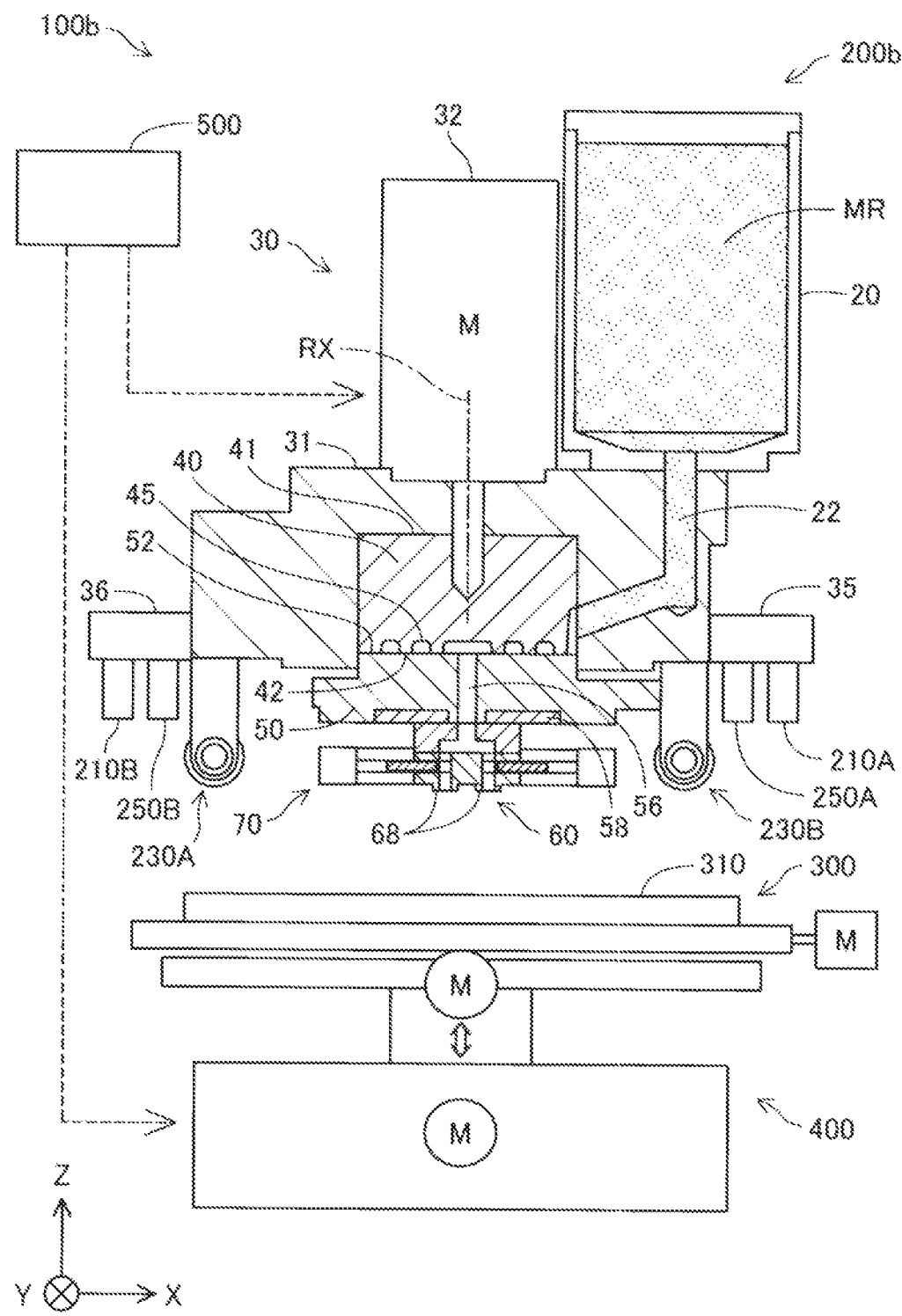
FIG. 10 is a cross-sectional view showing a schematic configuration of a three-dimensional shaping device according to a second embodiment.
Figure 11:
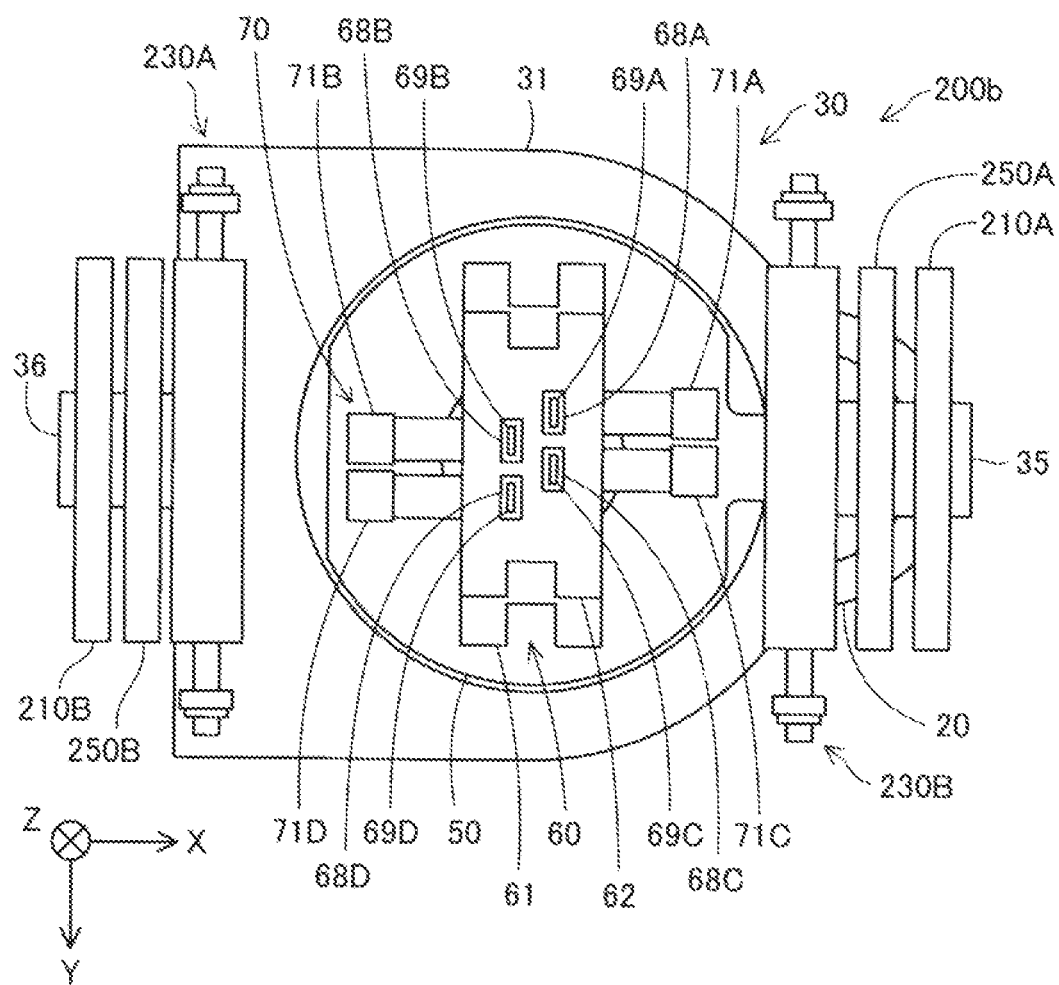
FIG. 11 is a bottom view showing a schematic configuration of a shaping unit according to the second embodiment.

FIG. 10 is a cross-sectional view showing a schematic configuration of a three-dimensional shaping device 100b according to a second embodiment. FIG. 11 is a bottom view showing a schematic configuration of a shaping unit 200b according to the second embodiment. The three-dimensional shaping device 100b according to the second embodiment is different from the three-dimensional shaping device 100 according to the first embodiment in that the shaping unit 200b includes two surface activation units 210A and 210B and two flattening units 230A and 230B. The three-dimensional shaping device 100b according to the second embodiment is different from the three-dimensional shaping device 100 according to the first embodiment in that two heating and cooling units 250A and 250B are provided instead of the reheating unit 220 and the cooling unit 240 shown in FIG. 1. The second embodiment is different from the first embodiment in that the control unit 500 controls each unit such that a n-th layer $L_n$ is formed at a forward path of a reciprocating movement of the shaping unit 200b with respect to the stage 300 and a (n+1)-th layer $L_{n+1}$ is formed at a backward path of the reciprocating movement. Other configurations are the same as those according to the first embodiment shown in FIG. 1 unless otherwise specified.

In the following description, the surface activation unit 210A is referred to as a first surface activation unit 210A, and the surface activation unit 210B is referred to as a second surface activation unit 210B. The flattening unit 230A is referred to as a first flattening unit 230A, and the flattening unit 230B is referred to as a second flattening unit 230B. The heating and cooling unit 250A is referred to as a first heating and cooling unit 250A, and the heating and cooling unit 250B is referred to as a second heating and cooling unit 250B. The first surface activation unit 210A and the first heating and cooling unit 250A may be referred to as a first shaping assisting unit, and the second surface activation unit 210B and the second heating and cooling unit 250B may be referred to as a second shaping assisting unit.

The first surface activation unit 210A is disposed at a +X direction side with respect to each of the nozzles 68A to 68D and at a +Z direction side with respect to each of the nozzles 68A to 68D, and is fixed to the first support unit 35. The second surface activation unit 210B is disposed at a −X direction side with respect to each of the nozzles 68A to 68D and at the +Z direction side with respect to each of the nozzles 68A to 68D, and is fixed to the second support unit 36. A configuration of each of the surface activation units 210A and 210B is the same as a configuration of the surface activation unit 210 according to the first embodiment shown in FIGS. 1 and 2.

The first heating and cooling unit 250A is disposed between each of the nozzles 68A to 68D and the first surface activation unit 210A in the X direction and at the +Z direction side with respect to each of the nozzles 68A to 68D, and is fixed to the first support unit 35. The second heating and cooling unit 250B is disposed between each of the nozzles 68A to 68D and the second surface activation unit 210B in the X direction and at the +Z direction side with respect to each of the nozzles 68A to 68D, and is fixed to the second support unit 36. Each of the heating and cooling units 250A and 250B has both a function of heating the shaping layer and a function of cooling the shaping layer. In the present embodiment, each of the heating and cooling units 250A and 250B is a blower having both a function of blowing hot air and a function of blowing cold air. The first heating and cooling unit 250A in a state of exhibiting the function of heating the shaping layer may be referred to as a reheating unit, and the first heating and cooling unit 250A in a state of exhibiting the function of cooling the shaping layer may be referred to as a cooling unit. The second heating and cooling unit 250B in a state of exhibiting the function of heating the shaping layer may be referred to as a reheating unit, and the first heating and cooling unit 250A in a state of exhibiting the function of cooling the shaping layer may be referred to as a cooling unit.

The first flattening unit 230A is disposed between each of the nozzles 68A to 68D and the second heating and cooling unit 250B in the X direction, and is fixed to a lower end portion of the barrel 50. The second flattening unit 230B is disposed between each of the nozzles 68A to 68D and the first heating and cooling unit 250A in the X direction, and is fixed to the lower end portion of the barrel 50. A configuration of each of the flattening units 230A and 230B is the same as a configuration of the flattening unit 230 according to the first embodiment shown in FIGS. 1 and 2. The roller support unit 232 of the first flattening unit 230A and the roller support unit 232 of the second flattening unit 230B may be referred to as a position changing unit.

Figure 12:
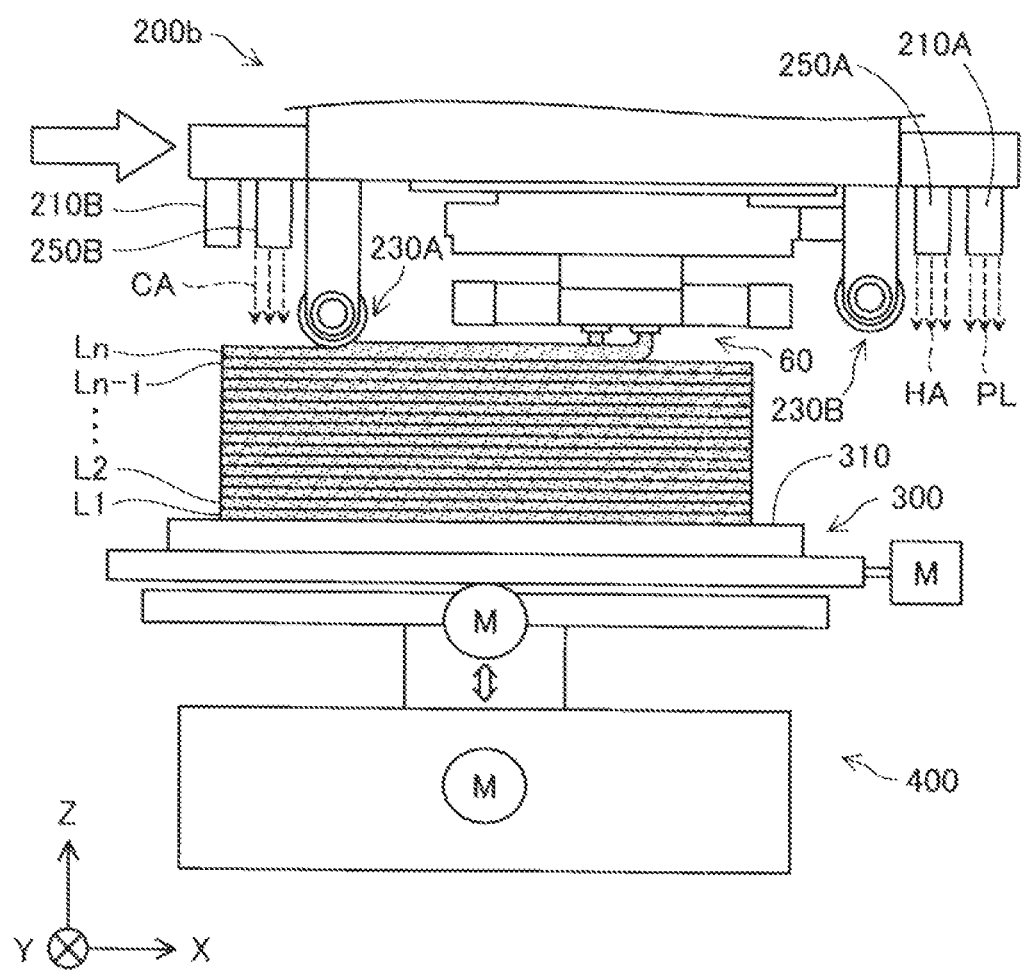
FIG. 12 is a first side view schematically showing a state where a shaping layer according to the second embodiment is formed.
Figure 13:
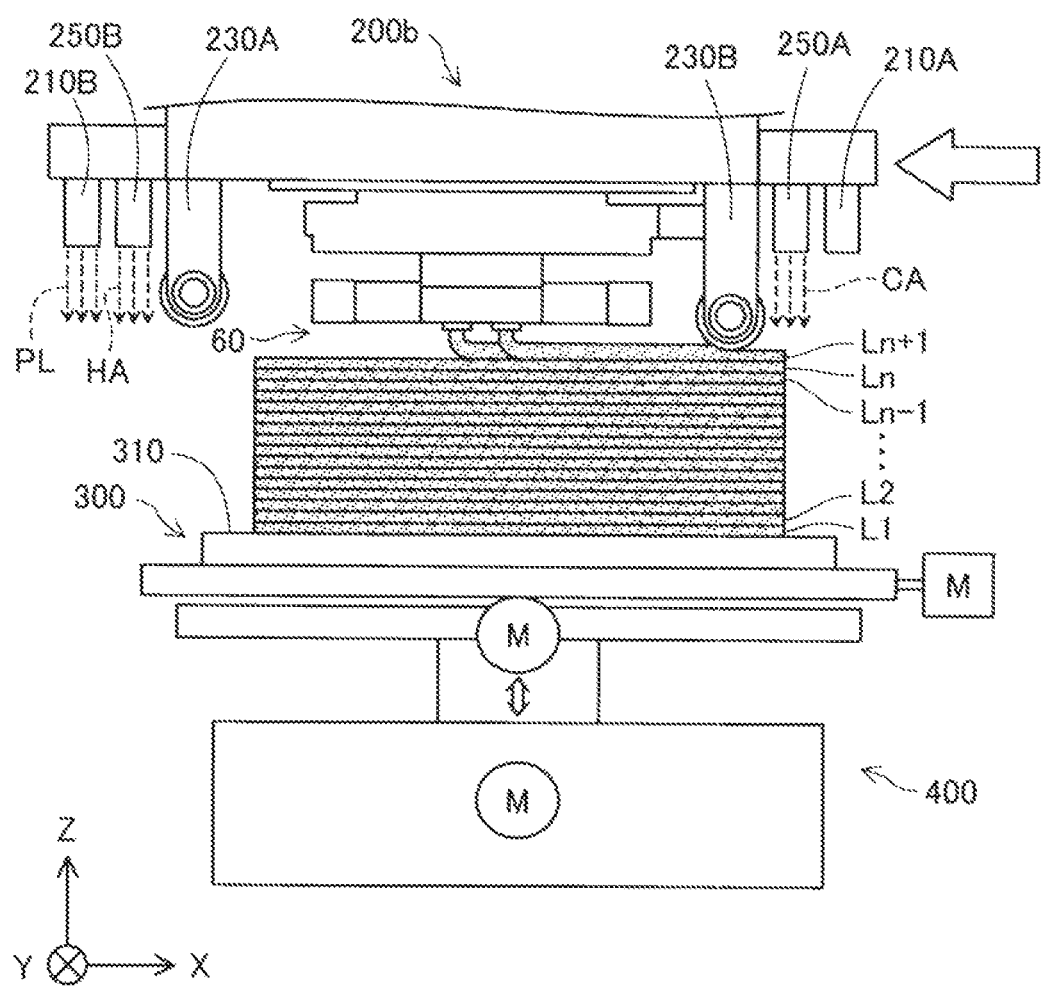
FIG. 13 is a second side view schematically showing a state where the shaping layer according to the second embodiment is formed.

FIG. 12 is a first side view schematically showing a state where a shaping layer is formed by the three-dimensional shaping device 100b according to the present embodiment. FIG. 13 is a second side view schematically showing a state where a shaping layer is formed by the three-dimensional shaping device 100b according to the present embodiment. As shown in FIG. 12, when a n-th layer $L_n$, which is the n-th shaping layer to be formed, is formed, the control unit 500 controls the moving unit 400 to move the shaping unit 200b with respect to the stage 300 in the +X direction. In the present embodiment, prior to a movement of the shaping unit 200b with respect to the stage 300, the control unit 500 controls the roller support unit 232 of the second flattening unit 230B to raise the roller 231 of the second flattening unit 230B to the +Z direction side with respect to each of the nozzles 68A to 68D, and controls the roller support unit 232 of the first flattening unit 230A to lower the roller 231 of the first flattening unit 230A to the −Z direction side with respect to each of the nozzles 68A to 68D. That is, the control unit 500 causes a distance between the roller 231 of the first flattening unit 230A and the stage 300 to be smaller than a distance between the roller 231 of the second flattening unit 230B and the stage 300. The shaping unit 200b is moved with respect to the stage 300 in the +X direction, so that the first surface activation unit 210A, the first heating and cooling unit 250A, the second flattening unit 230B, the ejection unit 60, the first flattening unit 230A, the second heating and cooling unit 250B, and the second surface activation unit 210B, which are provided in the shaping unit 200b, pass over the (n−1)-th layer $L_{n-1}$ in this order.

An upper surface of the (n−1)-th layer $L_{n-1}$ is chemically activated by being irradiated with plasma PL from the first surface activation unit 210A passing over the (n−1)-th layer $L_{n-1}$. Hot air HA is blown from the first heating and cooling unit 250A passing over the (n−1)-th layer $L_{n-1}$, so that the upper surface of the (n−1)-th layer $L_{n-1}$ is heated to a temperature equal to or higher than a glass transition point. A plasticized material is ejected from each of the nozzles 68A to 68D of the ejection unit 60 passing over the (n−1)-th layer $L_{n-1}$, so that the n-th layer $L_n$ is formed at the (n−1)-th layer $L_{n-1}$. The n-th layer $L_n$ formed at the (n−1)-th layer $L_{n-1}$ is flattened by being pressed by the roller 231 of the first flattening unit 230A. The n-th layer $L_n$ flattened by the first flattening unit 230A is cooled by cold air CA sent from the second heating and cooling unit 250B to promote curing. When the n-th layer $L_n$ is formed, the control unit 500 turns off irradiation with the plasma from the second surface activation unit 210B.

As shown in FIG. 13, when the (n+1)-th layer $L_{n+1}$, which is a (n+1)-th shaping layer to be formed, is formed, the control unit 500 controls the moving unit 400 to move the shaping unit 200b with respect to the stage 300 in the −X direction. Prior to a movement of the shaping unit 200b with respect to the stage 300, the control unit 500 controls the roller support unit 232 of the second flattening unit 230B to lower the roller 231 of the second flattening unit 230B to the −Z direction side with respect to each of the nozzles 68A to 68D, and controls the roller support unit 232 of the first flattening unit 230A to raise the roller 231 of the first flattening unit 230A to the +Z direction side with respect to each of the nozzles 68A to 68D. That is, the control unit 500 causes a distance between the roller 231 of the second flattening unit 230B and the stage 300 to be smaller than a distance between the roller 231 of the first flattening unit 230A and the stage 300. The shaping unit 200b is moved with respect to the stage 300 in the −X direction, so that the second surface activation unit 210B, the second heating and cooling unit 250B, the first flattening unit 230A, the ejection unit 60, the second flattening unit 230B, the first heating and cooling unit 250A, and the first surface activation unit 210A, which are provided in the shaping unit 200b, pass over the n-th layer $L_n$ in this order.

An upper surface of the n-th layer $L_n$ is chemically activated by being irradiated with the plasma PL from the second surface activation unit 210B passing over the n-th layer $L_n$. The hot air HA is blown from the second heating and cooling unit 250B passing over the n-th layer $L_n$, so that the upper surface of the n-th layer $L_n$ is heated to a temperature equal to or higher than the glass transition point. A plasticized material is ejected from each of the nozzles 68A to 68D of the ejection unit 60 passing over the n-th layer $L_n$, so that the (n+1)-th layer $L_{n+1}$ is formed at the n-th layer $L_n$. The (n+1)-th layer $L_{n+1}$ formed at the n-th layer $L_n$ is flattened by being pressed by the roller 231 of the second flattening unit 230B. The (n+1)-th layer $L_{n+1}$ flattened by the second flattening unit 230B is cooled by the cold air CA sent from the first heating and cooling unit 250A to promote curing. When the (n+1)-th layer $L_{n+1}$ is formed, the control unit 500 turns off the irradiation with the plasma from the first surface activation unit 210A.

According to the three-dimensional shaping device 100b in the present embodiment described above, the shaping layer is formed in each of the forward path and the backward path of the reciprocating movement of the shaping unit 200b with respect to the stage 300 along the X direction, and thus a shaping time can be shortened as compared with that according to the first embodiment. Further, when the shaping unit 200b is relatively moved in the +X direction to form a shaping layer, the shaping layer can be flattened by the roller 231 of the first flattening unit 230A, and when the shaping unit 200b is relatively moved in the −X direction to form a shaping layer, the shaping layer can be flattened by the roller 231 of the second flattening unit 230B.

In the present embodiment, the second surface activation unit 210B, the second heating and cooling unit 250B, and the first flattening unit 230A are provided symmetrically with respect to the first surface activation unit 210A, the first heating and cooling unit 250A, and the second flattening unit 230B with the nozzles 68A to 68D interposed therebetween. Therefore, not only when the shaping unit 200b is moved with respect to the stage 300 in the +X direction, but also when the shaping unit 200b is moved with respect to the stage 300 in the −X direction, it is possible to chemically activate the upper surface of a present layer which is an already formed shaping layer, heat the upper surface of the present layer, flatten a newly formed shaping layer, and cool the newly formed shaping layer.

C. Third Embodiment

Figure 14:
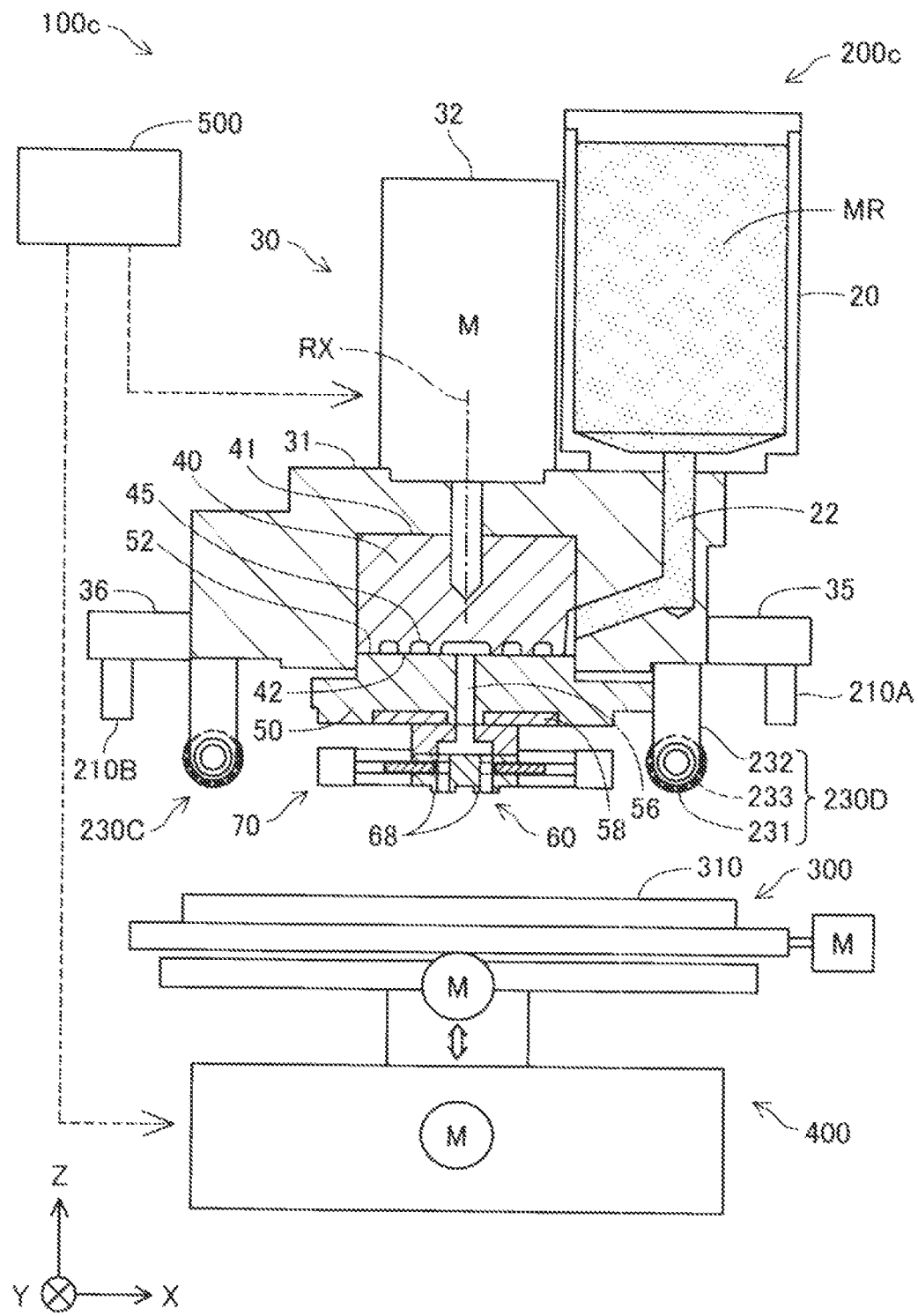
FIG. 14 is a cross-sectional view showing a schematic configuration of a three-dimensional shaping device according to a third embodiment.
Figure 15:
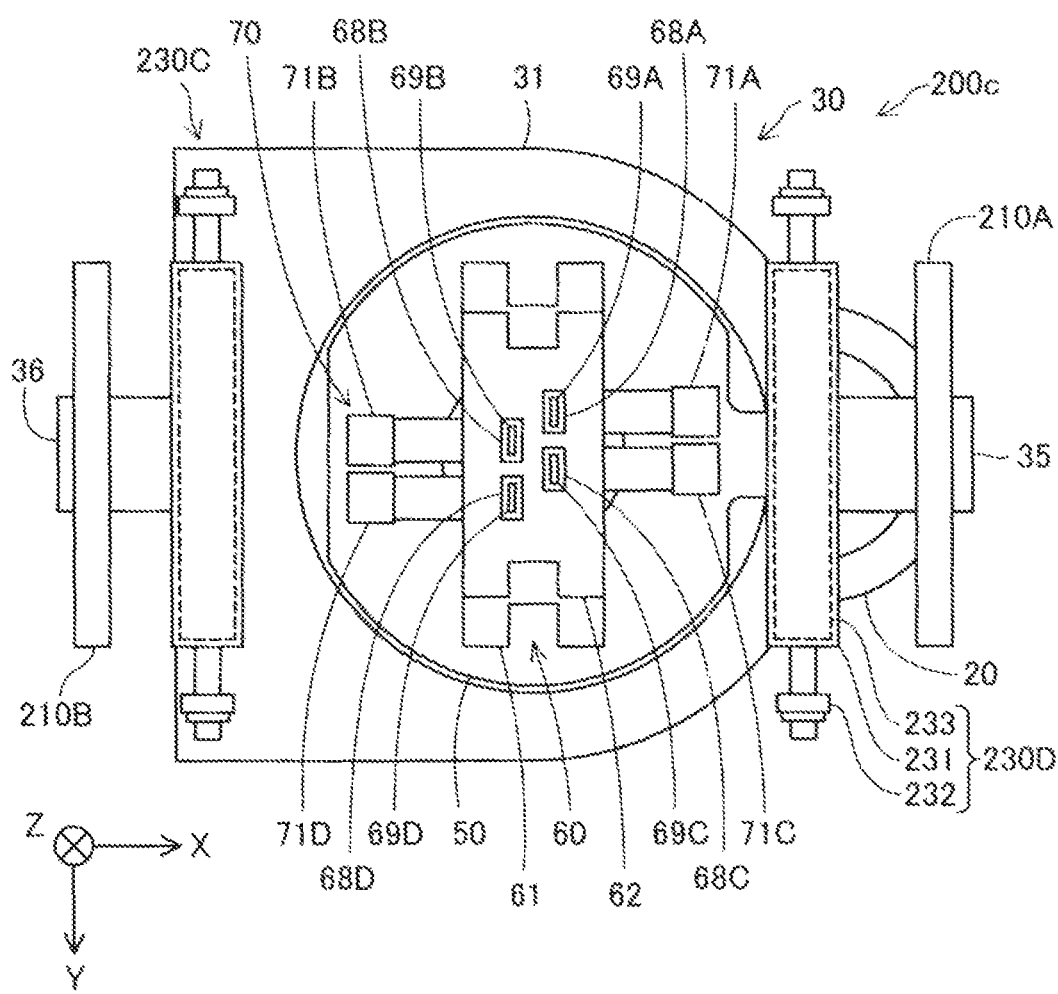
FIG. 15 is a bottom view showing a schematic configuration of a shaping unit according to the third embodiment.

FIG. 14 is a side view showing a schematic configuration of a three-dimensional shaping device 100c according to a third embodiment. FIG. 15 is a bottom view showing a schematic configuration of a shaping unit 200c according to the third embodiment. The three-dimensional shaping device 100c according to the third embodiment is different from the three-dimensional shaping device 100 according to the first embodiment in that the shaping unit 200c includes two surface activation units 210A and 210B and two flattening units 230C and 230D, and that the two flattening units 230C and 230D include a heater 233. The three-dimensional shaping device 100c according to the third embodiment does not include the reheating unit 220 and the cooling unit 240 shown in FIG. 1. The third embodiment is different from the first embodiment in that the control unit 500 controls each unit such that a n-th layer $L_n$ is formed in a forward path of a reciprocating movement of the shaping unit 200c with respect to the stage 300 and a (n+1)-th layer $L_{n+1}$ is formed in a backward path of the reciprocating movement. Other configurations are the same as those according to the first embodiment shown in FIG. 1 unless otherwise specified.

In the following description, the surface activation unit 210A is referred to as a first surface activation unit 210A, and the surface activation unit 210B is referred to as a second surface activation unit 210B. The flattening unit 230C is referred to as a first flattening unit 230C, and the flattening unit 230D is referred to as a second flattening portion 230D. The first surface activation unit 210A may be referred to as a first shaping assisting unit, and the second surface activation unit 210B may be referred to as a second shaping assisting unit.

The first surface activation unit 210A is disposed at a +X direction side with respect to each of the nozzles 68A to 68D and at a +Z direction side with respect to each of the nozzles 68A to 68D, and is fixed to the first support unit 35. The second surface activation unit 210B is disposed at a −X direction side with respect to each of the nozzles 68A to 68D and at the +Z direction side with respect to each of the nozzles 68A to 68D, and is fixed to the second support unit 36. A configuration of each of the surface activation units 210A and 210B is the same as a configuration of the surface activation unit 210 according to the first embodiment shown in FIGS. 1 and 2.

The first flattening unit 230C is disposed between each of the nozzles 68A to 68D and the second surface activation unit 210B in the X direction, and is fixed to a lower end portion of the barrel 50. The second flattening unit 230D is disposed between each of the nozzles 68A to 68D and the first surface activation unit 210A in the X direction, and is fixed to the lower end portion of the barrel 50. Each of the flattening units 230C and 230D includes the heater 233 that heats the roller 231. In the present embodiment, the heater 233 is provided inside the roller 231. A temperature of the heater 233 is controlled by the control unit 500. Other configurations of the flattening units 230C and 230D are the same as a configuration of the flattening unit 230 according to the first embodiment shown in FIG. 1. The heater 233 provided in the roller 231 of the first flattening unit 230C may be referred to as a first heater, and the heater 233 provided in the roller 231 of the second flattening unit 230D may be referred to as a second heater. The roller support unit 232 of the first flattening unit 230C and the roller support unit 232 of the second flattening unit 230D may be referred to as a position changing unit.

Figure 16:
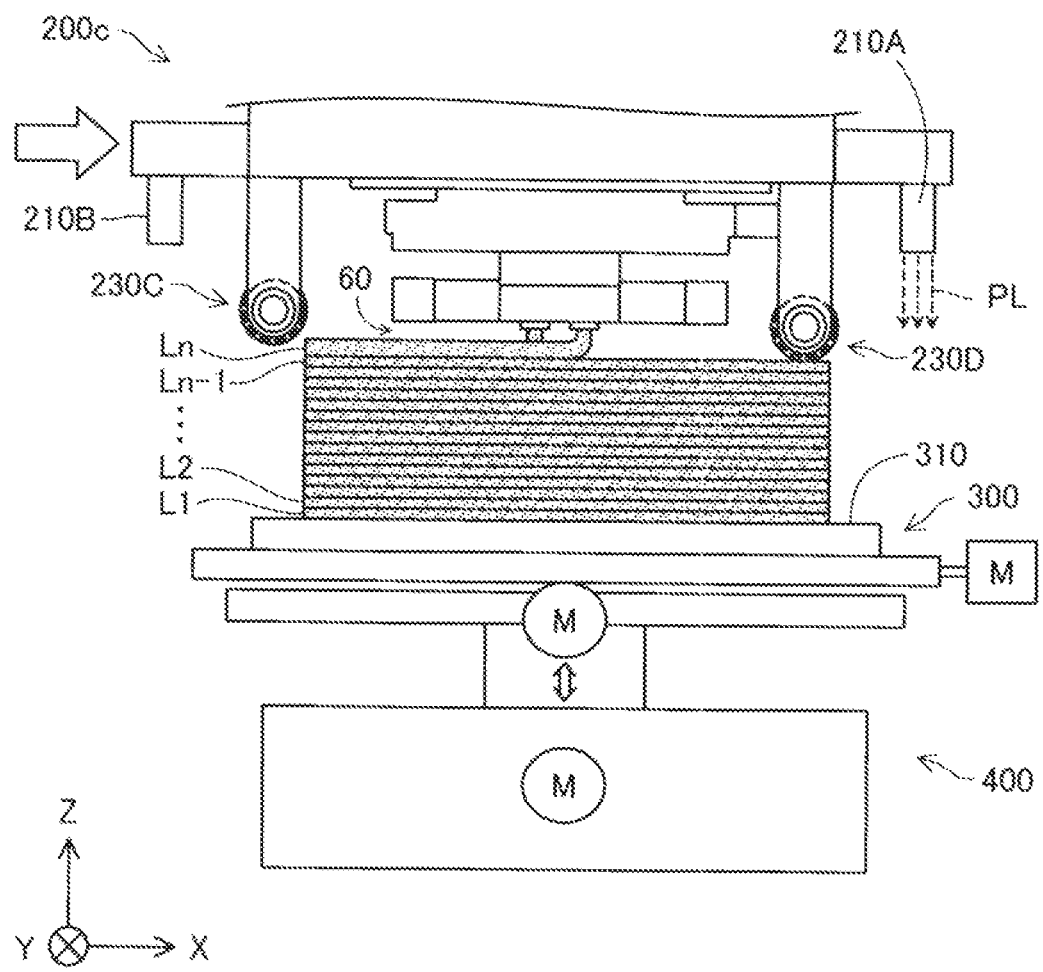
FIG. 16 is a first side view schematically showing a state where a shaping layer according to the third embodiment is formed.
Figure 17:
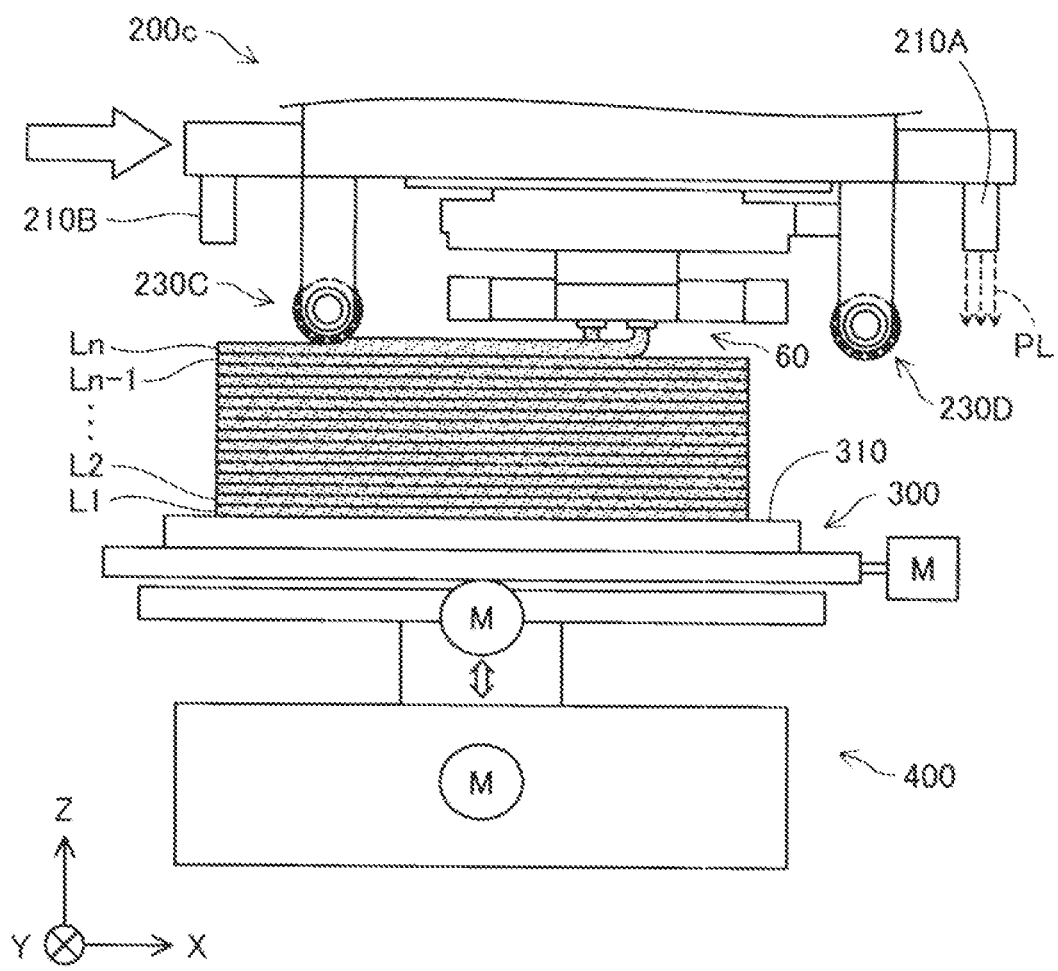
FIG. 17 is a second side view schematically showing a state where the shaping layer according to the third embodiment is formed.

FIG. 16 is a first side view showing a state where a shaping layer is formed by the three-dimensional shaping device 100c according to the present embodiment. FIG. 17 is a second side view showing a state where a shaping layer is formed by the three-dimensional shaping device 100c according to the present embodiment. As shown in FIG. 16, when a n-th layer of a shaping layer is formed, the control unit 500 controls the moving unit 400 to move the shaping unit 200c with respect to the stage 300 in a +X direction. In the present embodiment, prior to a movement of the shaping unit 200c with respect to the stage 300, the control unit 500 controls the roller support units 232 of the flattening units 230C and 230D to cause a distance between the roller 231 of the second flattening unit 230D and the stage 300 to be smaller than a distance between the roller 231 of the first flattening unit 230C and the stage 300. Further, the control unit 500 turns on the heater 233 of the second flattening unit 230D and turns off the heater 233 of the first flattening unit 230C. The shaping unit 200c is moved with respect to the stage 300 in the +X direction, so that the first surface activation unit 210A, the second flattening unit 230D, the ejection unit 60, the first flattening unit 230C, and the second surface activation unit 210B, which are provided in the shaping unit 200c, pass over a (n−1)-th layer $L_{n-1}$ in this order.

An upper surface of the (n−1)-th layer $L_{n-1}$ is chemically activated by being irradiated with plasma PL from the first surface activation unit 210A passing over the (n−1)-th layer $L_{n-1}$. When the roller 231 of the second flattening unit 230D passes over the (n−1)-th layer $L_{n-1}$ while being in contact with the upper surface of the (n−1)-th layer $L_{n-1}$, the upper surface of the (n−1)-th layer $L_{n-1}$ is heated to a temperature equal to or higher than a glass transition point. As shown in FIG. 17, a plasticized material is ejected from each of nozzles 68A to 68D of the ejection unit 60 passing over the (n−1)-th layer $L_{n-1}$ heated by the second flattening unit 230D, so that the n-th layer $L_n$ is formed at the (n−1)-th layer $L_{n-1}$. The n-th layer $L_n$ formed at the (n−1)-th layer $L_{n-1}$ is flattened by being pressed by the roller 231 of the first flattening unit 230C. When the n-th layer $L_n$ is formed, the control unit 500 turns off irradiation with the plasma from the second surface activation unit 210B.

When a (n+1)-th layer $L_{n+1}$ of the shaping layer is shaped, the control unit 500 controls the moving unit 400 to move the shaping unit 200c with respect to the stage 300 in a −X direction. In the present embodiment, prior to a movement of the shaping unit 200c with respect to the stage 300, the control unit 500 controls the roller support units 232 of the flattening units 230C and 230D to cause a distance between the roller 231 of the first flattening unit 230C and the stage 300 to be smaller than a distance between the roller 231 of the second flattening unit 230D and the stage 300. Further, the control unit 500 turns on the heater 233 of the first flattening unit 230C and turns off the heater 233 of the second flattening unit 230D. The shaping unit 200c is moved with respect to the stage 300 in the −X direction, so that the second surface activation unit 210B, the first flattening unit 230C, the ejection unit 60, the second flattening unit 230D, and the first surface activation unit 210A, which are provided in the shaping unit 200c, pass over the n-th layer $L_n$ in this order.

An upper surface of the n-th layer $L_n$ is chemically activated by being irradiated with the plasma PL from the second surface activation unit 210B passing over the n-th layer $L_n$. The roller 231 of the first flattening unit 230C passes over the n-th layer $L_n$ while being in contact with the upper surface of the n-th layer $L_n$, so that the upper surface of the n-th layer $L_n$ is heated to a temperature equal to or higher than the glass transition point. A plasticized material is ejected from each of the nozzles 68A to 68D of the ejection unit 60 passing over the n-th layer $L_n$, so that the (n+1)-th layer $L_{n+1}$ is formed at the n-th layer $L_n$. The (n+1)-th layer $L_{n+1}$ formed at the n-th layer $L_n$ is flattened by being pressed by the roller 231 of the second flattening unit 230D. When the (n+1)-th layer $L_{n+1}$ is formed, the control unit 500 turns off the irradiation with the plasma from the first surface activation unit 210A.

According to the three-dimensional shaping device 100c in the present embodiment described above, when the shaping unit 200c is moved with respect to the stage 300 in the +X direction to form the n-th layer $L_n$ of the shaping layer, prior to ejection of a plasticized material from each of the nozzles 68A to 68D onto the (n−1)-th layer $L_{n-1}$, the upper surface of the (n−1)-th layer $L_{n-1}$ can be heated by the second flattening unit 230D and the n-th layer $L_n$ formed at the (n−1)-th layer $L_{n-1}$ can be flattened by the first flattening unit 230C. Further, when the shaping unit 200c is moved with respect to the stage 300 in the −X direction to form the (n+1)-th layer $L_{n+1}$ of the shaping layer, prior to the ejection of the plasticized material from each of the nozzles 68A to 68D onto the n-th layer $L_n$, the upper surface of the n-th layer $L_n$ can be heated by the first flattening unit 230C and the (n+1)-th layer $L_{n+1}$ formed at the n-th layer $L_n$ can be flattened by the second flattening unit 230D.

D. Other Embodiments (D1) The three-dimensional shaping device 100 according to the first embodiment described above includes the surface activation unit 210. However, the three-dimensional shaping device 100 may not include the surface activation unit 210. The three-dimensional shaping device 100b according to the second embodiment and the three-dimensional shaping device 100c according to the third embodiment include the first surface activation unit 210A and the second surface activation unit 210B. However, the three-dimensional shaping devices 100b and 100c may not include the first surface activation unit 210A and the second surface activation unit 210B.

(D2) The three-dimensional shaping device 100 according to the first embodiment described above includes the reheating unit 220. However, the three-dimensional shaping device 100 may not include the reheating unit 220.

(D3) The three-dimensional shaping device 100 according to the first embodiment described above includes the flattening unit 230. However, the three-dimensional shaping device 100 may not include the flattening unit 230.

(D4) The three-dimensional shaping device 100 according to the first embodiment described above includes the cooling unit 240. However, the three-dimensional shaping device 100 may not include the cooling unit 240.

(D5) The three-dimensional shaping device 100*b* according to the second embodiment described above includes the first heating and cooling unit 250A and the second heating and cooling unit 250B. However, the three-dimensional shaping device 100*b* may not include the first heating and cooling unit 250A and the second heating and cooling unit 250B.

(D6) The three-dimensional shaping device 100 according to the first embodiment described above includes the cooling unit 240 including a blower. On the other hand, the cooling unit 240 may be a cooling liquid tank that is disposed below the stage 300 and that is filled with a cooling liquid including water or a fluorine-based inert liquid. In this case, after a formation of each shaping layer is completed, the control unit 500 may lower the stage 300 and immerse each shaping layer in the cooling liquid to cool the shaping layer.

(D7) In the three-dimensional shaping devices 100 to 100*c* according to the embodiments described above, the valves 71A to 71D provided in the ejection switching unit open and close the individual flow paths 65A to 65D, respectively, by causing the valve units 75A to 75D disposed in the cylindrical cylinder portions 66A to 66D each centered on a central axis along an X direction to perform a translational operation along the X direction. However, the valves 71A to 71D provided in the ejection switching unit 70 may open and close the individual flow paths 65A to 65D, respectively, by causing the valve units 75A to 75D disposed in the cylindrical cylinder portion centered on a central axis along a Z direction to perform the translational operation along the Z direction.

(D8) In the three-dimensional shaping devices 100 to 100*c* according to the embodiments described above, the moving unit 400 may have a function of rotating the stage 300 about a rotation axis along the Z direction. In this case, since an orientation of the stage 300 with respect to the shaping units 200 to 200*c* can be changed, a shaping layer having a more complicated shape or a shaping layer having a larger area can be formed.

(D9) In the three-dimensional shaping devices 100 to 100*c* according to the embodiments described above, the plasticizing unit 30 includes the flat screw 40 and the barrel 50, and plasticizes a material using a relative rotation between the flat screw 40 and the barrel 50 to generate a plasticized material. However, the plasticizing unit 30 may include, instead of the flat screw 40, a screw that has an elongated columnar outer shape and in which a spiral groove is formed in a side surface portion of a column, and a cylindrical barrel surrounding the screw, and may plasticize a material using a relative rotation of the screw and the barrel to generate a plasticized material. The plasticizing unit 30 may not include the flat screw 40 or the screw described above. In this case, for example, as in a three-dimensional shaping device of a fused deposition modeling (FDM) system, a filament of a material may be plasticized by being heated by a heater to generate a plasticized material.

E. Other Aspects

The present disclosure is not limited to the embodiments described above, and can be implemented in various forms without departing from the scope of the present disclosure. For example, the present disclosure can be implemented by the following aspects. In order to solve a part or all of technical problems of the present disclosure, or to achieve a part or all of effects of the present disclosure, technical features in the above-described embodiments corresponding to technical features in aspects to be described below can be replaced or combined as appropriate. The technical features can be deleted as appropriate unless the technical features are described as essential in the present specification.

(1) According to an aspect of the present disclosure, a three-dimensional shaping device is provided. The three-dimensional shaping device includes: a plasticizing unit configured to plasticize a material to generate a plasticized material; a stage having a deposition surface on which the plasticized material is deposited; an ejection unit that has a plurality of nozzles arranged side by side along a first axis parallel to the deposition surface of the stage, and that is configured to eject the plasticized material in a continuous linear form from the plurality of nozzles toward the deposition surface; an ejection switching unit configured to individually switch between stopping and resuming ejection of the plasticized material from the plurality of nozzles; a moving unit configured to move the ejection unit with respect to the stage along a second axis that is parallel to the deposition surface of the stage and that intersects the first axis; and a control unit configured to laminate a shaping layer formed of the plasticized material on the deposited surface of the stage by controlling the plasticizing unit, the ejection switching unit, and the moving unit.

According to the three-dimensional shaping device in this aspect, since the shaping layer can be formed in a wide range at one time using the plurality of nozzles, a shaping time can be shortened. Further, since the plasticized material is ejected from each of the plurality of nozzles in a continuous linear form, it is possible to prevent formation of a shaping layer in which voids are unintentionally scattered along a moving direction of the nozzle with respect to the stage. Therefore, it is possible to shorten the shaping time of the three-dimensional shaped object formed by the laminated shaping layers while preventing a situation in which intended strength of the three-dimensional shaped object cannot be secured.

(2) In the three-dimensional shaping device according to the above aspect, the ejection unit may include a plurality of individual flow paths each communicating with a respective one of the plurality of nozzles, the ejection switching unit may include a plurality of valves each provided corresponding to a respective one of the plurality of individual flow paths, and the control unit may individually switch between stopping and resuming ejection of the plasticized material from each of the plurality of nozzles by individually opening and closing the plurality of valves.

According to the three-dimensional shaping device in this aspect, it is possible to individually switch between stopping and resuming the ejection of the plasticized material from each of the plurality of nozzles with a simple configuration.

(3) In the three-dimensional shaping device according to the above aspect, at least a part of the plurality of nozzles may be formed in a staggered manner when viewed in a direction from the stage toward the ejection unit.

According to the three-dimensional shaping device in this aspect, it is possible to narrow an interval between the nozzles adjacent to each other in a direction along the first axis.

(4) The three-dimensional shaping device according to the above aspect may further include a reheating unit that is disposed in front of the plurality of nozzles in a moving direction of the ejection unit along the second axis with respect to the stage when the shaping layer is formed, and that is configured to heat a surface of a present layer which is the already formed shaping layer.

According to the three-dimensional shaping device in this aspect, the shaping layer can be formed at the present layer heated by the reheating unit. Therefore, adhesion between the present layer and the shaping layer can be improved.

(5) The three-dimensional shaping device according to the above aspect may further include a surface activation unit that is disposed in front of the plurality of nozzles in a moving direction of the ejection unit along the second axis with respect to the stage when the shaping layer is formed, and that is configured to chemically activate a surface of a present layer which is the already formed shaping layer.

According to the three-dimensional shaping device in this aspect, the shaping layer can be formed at the present layer whose surface is chemically activated by the surface activation unit. Therefore, it is possible to increase a chemical bonding force between the present layer and the shaping layer.

(6) The three-dimensional shaping device according to the above aspect may further include a cooling unit that is disposed behind the plurality of nozzles in a moving direction of the ejection unit along the second axis with respect to the stage when the shaping layer is formed, and that is configured to cool the shaping layer.

According to the three-dimensional shaping device in this aspect, since the shaping layer can be cooled by the cooling unit to promote curing, it is possible to shorten a waiting time until the shaping layer is cured.

(7) The three-dimensional shaping device according to the above aspect may further include a flattening unit that is disposed behind the plurality of nozzles in a moving direction of the ejection unit along the second axis with respect to the stage when the shaping layer is formed, and that is configured to flatten the shaping layer.

According to the three-dimensional shaping device in this aspect, the shaping layer is flattened by the first flattening unit, and a width of each portion of the shaping layer formed of the plasticized material ejected from each nozzle in the direction along the first axis can be increased.

(8) The three-dimensional shaping device according to the above aspect may further include: a first flattening unit configured to flatten the shaping layer; a second flattening unit configured to flatten the shaping layer; and a position changing unit configured to change a distance between the first flattening unit and the stage and a distance between the second flattening unit and the stage, in which the first flattening unit, the plurality of nozzles, and the second flattening unit may be arranged in order along the second axis, and the control unit may be configured to, by controlling the position changing unit, when the first flattening unit is positioned behind the plurality of nozzles in a moving direction of the ejection unit along the second axis with respect to the stage when the shaping layer is formed, cause a distance between the first flattening unit and the stage to be smaller than a distance between the second flattening unit and the stage, and flatten the shaping layer by the first flattening unit, and when the second flattening unit is positioned behind the plurality of nozzles in the moving direction, cause a distance between the second flattening unit and the stage to be smaller than a distance between the first flattening unit and the stage, and flatten the shaping layer by the second flattening unit.

According to the three-dimensional shaping device in this aspect, when the shaping layer is formed in a forward path of a reciprocating movement of the ejection unit with respect to the stage, the shaping layer can be flattened by the first flattening unit, and when the shaping layer is formed in a backward path of the reciprocating movement, the shaping layer can be flattened by the second flattening unit.

(9) The three-dimensional shaping device according to the above aspect may further include: a first flattening unit that is configured to flatten the shaping layer and that includes a first heater configured to heat a surface of a present layer which is the already formed shaping layer; a second flattening unit that is configured to flatten the shaping layer and that includes a second heater configured to heat a surface of the present layer; and a position changing unit configured to change a distance between the first flattening unit and the stage and a distance between the second flattening unit and the stage, in which the first flattening unit, the plurality of nozzles, and the second flattening unit may be arranged in order along the second axis, and the control unit may be configured to, by controlling the position changing unit, the first heater, and the second heater, when the first flattening unit is positioned behind the plurality of nozzles in a moving direction of the ejection unit along the second axis with respect to the stage when the shaping layer is formed, cause a distance between the second flattening unit and the stage to be smaller than a distance between the first flattening unit and the stage, heat a surface of the present layer by the second heater, and flatten the shaping layer by the first flattening unit, and when the second flattening unit is positioned behind the plurality of nozzles in the moving direction, cause a distance between the first flattening unit and the stage to be smaller than a distance between the second flattening unit and the stage, heat a surface of the present layer by the first heater, and flatten the shaped layer by the second flattening unit.

According to the three-dimensional shaping device in this aspect, when the shaping layer is formed in the forward path of the reciprocating movement of the ejection unit with respect to the stage, the shaping layer can be formed at the present layer heated by the second heater and the shaping layer can be flattened by the first flattening unit, and when the shaping layer is formed in the backward path of the reciprocating movement, the shaping layer can be formed at the present layer heated by the first heater and the shaping layer can be flattened by the second flattening unit.

(10) The three-dimensional shaping device according to the above aspect may further include a first shaping assisting unit and a second shaping assisting unit that include at least one of a reheating unit configured to heat a surface of a present layer which is the already formed shaping layer, a surface activation unit configured to chemically activate the surface of the present layer, and a cooling unit configured to cool the shaping layer, in which the first shaping assisting unit, the plurality of nozzles, and the second shaping assisting unit may be arranged in order along the second axis.

According to the three-dimensional shaping device in this aspect, the first shaping assisting unit can be used when the shaping layer is formed in the forward path of the reciprocating movement of the ejection unit with respect to the stage, and the second shaping assisting unit can be used when the shaping layer is formed in the backward path of the reciprocating movement.

(11) In the three-dimensional shaping device according to the above aspect, the moving unit may rotate the stage about a rotation axis along a third axis perpendicular to the deposition surface.

According to the three-dimensional shaping device in this aspect, an orientation of the ejection unit with respect to the stage can be changed by rotating the stage.

The present disclosure can also be implemented in various forms other than the three-dimensional shaping device. For example, the present disclosure can be implemented in a form of a shaping head.

What is claimed is:

1. A three-dimensional shaping device, comprising: a plasticizing unit configured to plasticize a material to generate a plasticized material; a stage having a deposition surface on which the plasticized material is deposited; an ejection unit that has a plurality of nozzles arranged side by side along a first axis parallel to the deposition surface of the stage, and that is configured to eject the plasticized material in a continuous linear form from the plurality of nozzles toward the deposition surface; an ejection switching unit configured to individually switch between stopping and resuming ejection of the plasticized material from the plurality of nozzles; a moving unit configured to move the ejection unit with respect to the stage along a second axis that is parallel to the deposition surface of the stage and that intersects the first axis; and a control unit configured to laminate a shaping layer formed of the plasticized material on the deposition surface of the stage by controlling the plasticizing unit, the ejection switching unit, and the moving unit; wherein the ejection unit includes a plurality of individual flow paths each communicating with a respective one of the plurality of nozzles, the ejection switching unit includes a plurality of valves each provided corresponding to a respective one of the plurality of individual flow paths, and the control unit individually switches between stopping and resuming the ejection of the plasticized material from the plurality of nozzles by individually opening and closing the plurality of valves.

2. The three-dimensional shaping device according to claim 1, wherein
at least a part of the plurality of nozzles are formed in a staggered manner when viewed in a direction from the stage toward the ejection unit.

3. The three-dimensional shaping device according to claim 1, further comprising:
a reheating unit that is disposed in front of the plurality of nozzles in a moving direction of the ejection unit along the second axis with respect to the stage when the shaping layer is formed, and that is configured to heat a surface of a present layer which is the already formed shaping layer.

4. The three-dimensional shaping device according to claim 1, further comprising:
a surface activation unit that is disposed in front of the plurality of nozzles in a moving direction of the ejection unit along the second axis with respect to the stage when the shaping layer is formed, and that is configured to chemically activate a surface of a present layer which is the already formed shaping layer.

5. The three-dimensional shaping device according to claim 1, further comprising:
a cooling unit that is disposed behind the plurality of nozzles in a moving direction of the ejection unit along the second axis with respect to the stage when the shaping layer is formed, and that is configured to cool the shaping layer.

6. The three-dimensional shaping device according to claim 1, further comprising:
a flattening unit that is disposed behind the plurality of nozzles in a moving direction of the ejection unit along the second axis with respect to the stage when the shaping layer is formed, and that is configured to flatten the shaping layer.

7. The three-dimensional shaping device according to claim 1, further comprising:
a first flattening unit configured to flatten the shaping layer;
a second flattening unit configured to flatten the shaping layer; and
a position changing unit configured to change a distance between the first flattening unit and the stage and a distance between the second flattening unit and the stage, wherein
the first flattening unit, the plurality of nozzles, and the second flattening unit are arranged in order along the second axis, and
the control unit is configured to, by controlling the position changing unit,
when the first flattening unit is positioned behind the plurality of nozzles in a moving direction of the ejection unit along the second axis with respect to the stage when the shaping layer is formed, cause a distance between the first flattening unit and the stage to be smaller than a distance between the second flattening unit and the stage, and flatten the shaping layer by the first flattening unit, and
when the second flattening unit is positioned behind the plurality of nozzles in the moving direction, cause a distance between the second flattening unit and the stage to be smaller than a distance between the first flattening unit and the stage, and flatten the shaping layer by the second flattening unit.

8. The three-dimensional shaping device according to claim 1, further comprising:
a first flattening unit that is configured to flatten the shaping layer and that includes a first heater configured to heat a surface of a present layer which is the already formed shaping layer;
a second flattening unit that is configured to flatten the shaping layer and that includes a second heater configured to heat a surface of the present layer; and
a position changing unit configured to change a distance between the first flattening unit and the stage and a distance between the second flattening unit and the stage, wherein
the first flattening unit, the plurality of nozzles, and the second flattening unit are arranged in order along the second axis, and
the control unit is configured to, by controlling the position changing unit, the first heater, and the second heater,
when the first flattening unit is positioned behind the plurality of nozzles in a moving direction of the ejection unit along the second axis with respect to the stage when the shaping layer is formed, cause a distance between the second flattening unit and the stage to be smaller than a distance between the first flattening unit and the stage, heat a surface of the present layer by the second heater, and flatten the shaping layer by the first flattening unit, and when the second flattening unit is positioned behind the plurality of nozzles in the moving direction, cause a distance between the first flattening unit and the stage to be smaller than a distance between the second flattening unit and the stage, heat a surface of the present layer by the first heater, and flatten the shaping layer by the second flattening unit.

9. The three-dimensional shaping device according to claim 1, further comprising:

a first shaping assisting unit and a second shaping assisting unit that include at least one of a reheating unit configured to heat a surface of a present layer which is the already formed shaping layer, a surface activation unit configured to chemically activate the surface of the present layer, and a cooling unit configured to cool the shaping layer, wherein the first shaping assisting unit, the plurality of nozzles, and the second shaping assisting unit are arranged in order along the second axis.

10. The three-dimensional shaping device according to claim 1, wherein the moving unit rotates the stage about a rotation axis along a third axis perpendicular to the deposition surface.

\* \* \* \* \*